United States Patent
Sivapurapu et al.

(10) Patent No.: US 12,141,904 B1
(45) Date of Patent: Nov. 12, 2024

(54) CONTROLLING JOINTS USING LEARNED TORQUES

(71) Applicant: Apple Inc., Cupertino, CA (US)

(72) Inventors: Siva Chandra Mouli Sivapurapu, Santa Clara, CA (US); Edward S. Ahn, Mountain View, CA (US); Mark Drummond, Palo Alto, CA (US); Aashi Manglik, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/872,860

(22) Filed: Jul. 25, 2022

Related U.S. Application Data

(63) Continuation of application No. 17/173,480, filed on Feb. 11, 2021, now Pat. No. 11,430,170.

(60) Provisional application No. 62/982,284, filed on Feb. 27, 2020.

(51) Int. Cl.
*G06T 13/40* (2011.01)
*G06T 7/246* (2017.01)
*G06T 7/70* (2017.01)

(52) U.S. Cl.
CPC .............. *G06T 13/40* (2013.01); *G06T 7/248* (2017.01); *G06T 7/70* (2017.01); *G06T 2207/10016* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 2011/0054870 A1* | 3/2011 | Dariush | G16H 50/50 348/46 |
| 2016/0059412 A1* | 3/2016 | Oleynik | B25J 19/02 700/250 |
| 2016/0067136 A1* | 3/2016 | Raghavan | A61B 5/225 601/40 |
| 2018/0165864 A1* | 6/2018 | Jin | G06F 3/0346 |
| 2019/0005699 A1* | 1/2019 | Anderson | G06F 16/953 |
| 2019/0295305 A1* | 9/2019 | Yang | G06N 3/044 |
| 2020/0005544 A1* | 1/2020 | Kim | G06T 13/40 |
| 2020/0250874 A1* | 8/2020 | Assouline | G06N 3/08 |

OTHER PUBLICATIONS

Oshita, "Motion-Capture Based Avatar Control Framework in Third-Person View Virtual Environments" (Year: 2006).*

* cited by examiner

*Primary Examiner* — Hilina K Demeter
(74) *Attorney, Agent, or Firm* — Fernando & Partners, LLP

(57) ABSTRACT

A method includes displaying, via a display device, a virtual agent moving according to a motion type. The virtual agent is defined by a plurality of virtual joints and motions of the virtual agent are controllable by providing a corresponding plurality of torques to the plurality of virtual joints. The method includes, while the virtual agent is moving according to the motion type, registering an interaction event with the virtual agent. The interaction event initiates a change to the motion type. The method includes, in response to registering the interaction event, generating, using a motion controller, a plurality of torque values for the virtual agent based on a function of the motion type and the interaction event, and generating an animation for the virtual agent by providing the plurality of torque values to the plurality of virtual joints of the virtual agent.

20 Claims, 19 Drawing Sheets

CONTROLLING JOINTS USING LEARNED TORQUES

CROSS-REFERENCE TO RELATED APPLICATIONS

This application is a continuation of U.S. patent application Ser. No. 17/173,480, filed on Feb. 11, 2021, which claims priority to U.S. Provisional Patent App. No. 62/982,284, filed on Feb. 27, 2020, both of which are hereby incorporated by reference in their entirety.

TECHNICAL FIELD

The present disclosure relates to controlling a virtual agent, and, in particular, controlling joints of the virtual agent based on learned torque values.

BACKGROUND

A virtual agent may represent a real-world or fictional entity. A current system may control (e.g., drive) motions of the virtual agent by merely providing animations. In order to animate the virtual agent as performing a particular motion, the current system arranges a respective sequence of preauthored animation segments.

However, animating the motions of the virtual agent by arranging sequences of preauthored animation segments is problematic for a number of reasons. For example, because each motion of the virtual agent corresponds to a set of preauthored animation segments, the number of motions of the virtual agent is limited by the number of existing preauthored animation segments as well as available resources for using the preauthored animation segments. As another example, a current system does not control how preauthored animation segments may be sequentially related to each other, and thus the current system may generate a sequence of preauthored animation segments that does not correspond to a physically realistic motion. As yet another example, preauthored animation segments cannot be adapted to new types of interactions that were not considered before the interactions.

SUMMARY

In accordance with some implementations, a method is performed at an electronic device with one or more processors and a non-transitory memory. The method includes obtaining video data that includes a representation of a first plurality of motions of a real-world entity. The method includes determining, from the video data, a plurality of estimated torque values using a motion controller. The plurality of estimated torque values is associated with a plurality of real-world joints of the real-world entity corresponding to the first plurality of motions. The method includes generating a second plurality of motions of a virtual agent by providing the plurality of estimated torque values to a corresponding plurality of virtual joints of the virtual agent. Movement of the virtual agent is controllable by the plurality of virtual joints. The plurality of virtual joints corresponds to the plurality of real-world joints of the real-world entity. The method includes comparing the first plurality of motions of the real-world entity against the second plurality of motions of the virtual agent. The method includes, in accordance with a determination that a result of the comparison between the first plurality of motions and the second plurality of motions satisfies a performance metric, outputting a convergence indicator associated with the motion controller. The method includes, in accordance with a determination that a result of the comparison between the first plurality of motions and the second plurality of motions does not satisfy the performance metric, changing an operational value of the motion controller.

In accordance with some implementations, a method is performed at an electronic device with one or more processors, a non-transitory memory, and a display device. The method includes displaying, via the display device, a virtual agent moving according to a motion type. The virtual agent is defined by a plurality of virtual joints and motions of the virtual agent are controllable by providing a corresponding plurality of torques to the plurality of virtual joints. The method includes, while the virtual agent is moving according to the motion type, registering an interaction event with the virtual agent. The interaction event initiates a change to the motion type. The method includes, in response to registering the interaction event, generating, using a motion controller: a plurality of torque values for the virtual agent based on a function of the motion type and the interaction event, and generating an animation for the virtual agent by providing the plurality of torque values to the plurality of virtual joints of the virtual agent.

In accordance with some implementations, an electronic device includes one or more processors, a non-transitory memory, and optionally a display device. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

SUMMARY

Figure 1:
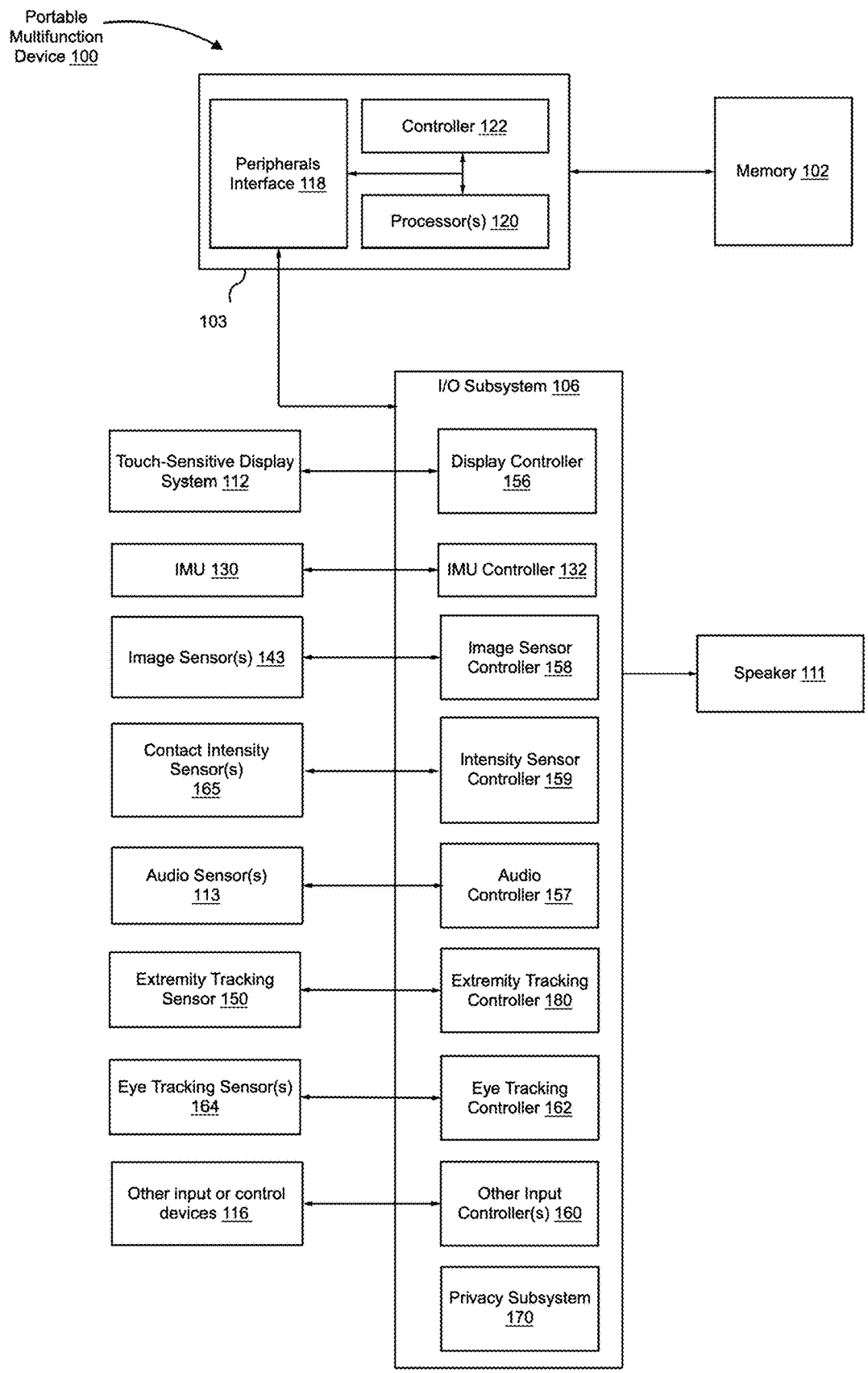
FIG. 1 is a block diagram of an example of a portable multifunction device in accordance with some implementations.

Some systems provide animations of a real-world or fictional entity, such as a video game character. An animation includes a series (e.g., segments) of preauthored motions of the entity, such as the video game character jumping in the air. However, the animation is not physically realistic. Moreover, because the animation is based on preauthored motions, the animation is limited by the resources associated with generating the preauthored motions, such as a person manually drawing a series of motions for a character. Additionally, the preauthored animation cannot be adapted to new types of interactions that were not considered before the interactions.

By contrast, various implementations disclosed herein include generating an animation for a virtual agent that is more physically realistic. To that end, various implementations include utilizing video data associated with a real-world entity, such as a real person, real animal, real machine (e.g., robot), etc. or an animation thereof. Various implementations define a virtual agent using a plurality of virtual joints (that connect member portions) that are controllable by torques, which are output from a machine-learned motion control model (motion controller). In operation, the machine-learned motion control model generates the torques in response to stimulus from user inputs and/or interactions between the virtual agent and other virtual elements. Various implementations include a motion controller that generates, based on the video data, torque values for the plurality of virtual joints comprising a virtual agent. The motion controller generates the torque values in response to any number of inputs, including user inputs interacting with the virtual agent, the virtual agent interacting with other elements, and the virtual agent interacting with other virtual agents.

During training, a motion controller determines estimated torque values associated with a set of motions of a real-world entity based on video data, which serves as training data. The estimated torque values are used to generate a set of motions for a virtual agent. The set of motions of the real-world entity is compared against the set of motions of the virtual agent. Based on the comparison, an operational value of the motion controller is modified until a performance metric is satisfied. Accordingly, operational weights of the motion controller that are associated with determining estimated torque values for the virtual agent are iteratively changed.

After being trained, the motion controller generates torque values and a corresponding animation for the virtual agent in response to registering an interaction event. The interaction event may correspond to one of an input directed to the virtual agent, another virtual agent interacting with the virtual agent, or a change to the environment associated with the virtual agent. Namely, while the virtual agent is moving according to a motion type, an electronic device registers the interaction event. In response to registering the interaction event, the motion controller drives the virtual agent based on the motion type and the interaction event. Accordingly, the motion controller generates a physically realistic animation for the virtual agent that accounts for a current movement of the virtual agent and an interaction with the virtual agent.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include smartphones, tablets, desktop/laptop computers, head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback and/or cameras having hand tracking and/or other body pose estimation abilities).

A head-mounted system may have one or more speaker(s) and an integrated opaque display. Alternatively, a head-mounted system may be a head-mounted enclosure (HME) configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a touch-sensitive display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g. the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the touch-sensitive display system 112 and the other input or control devices 116, with the peripherals interface 118. The I/O subsystem 106 optionally includes a display controller 156, an image sensor controller 158, an intensity sensor controller 159, an audio controller 157, an eye tracking controller 162, one or more input controllers 160 for other input or control devices, an IMU controller 132, an extremity tracking controller 180, and a privacy subsystem 170. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 160 are, optionally, coupled with any (or none) of the following: a keyboard, infrared port, Universal Serial Bus (USB) port, stylus, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a physical environment. In some implementations, the other input or control devices 116 includes a depth sensor (e.g., time of flight sensor) that obtains depth information associated with an eye gaze of a user.

The touch-sensitive display system 112 provides an input interface and an output interface between the electronic device 100 and a user. The display controller 156 receives and/or sends electrical signals from/to the touch-sensitive display system 112. The touch-sensitive display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system 112 has a touch-sensitive surface, sensor, or set of sensors that accepts input from the user based on haptic and/or tactile contact. The touch-sensitive display system 112 and the display controller 156 (along with any associated modules and/or sets of instructions in the memory 102) detect contact (and any movement or breaking of the contact) on the touch-sensitive display system 112 and converts the detected contact into interaction with user-interface objects (e.g., one or more soft keys, icons, web pages or images) that are displayed on the touch-sensitive display system 112. In an example implementation, a point of contact between the touch-sensitive display system 112 and the user corresponds to a finger of the user or a stylus.

The touch-sensitive display system 112 optionally uses LCD (liquid crystal display) technology, LPD (light emitting polymer display) technology, or LED (light emitting diode) technology, although other display technologies are used in other implementations. The touch-sensitive display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system 112.

The user optionally makes contact with the touch-sensitive display system 112 using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) 143 are integrated within an HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a CGR environment.

In various implementations, the electronic device 100 includes a privacy subsystem 170 that includes one or more privacy setting filters associated with user information, such as user information included in the eye gaze data and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2:
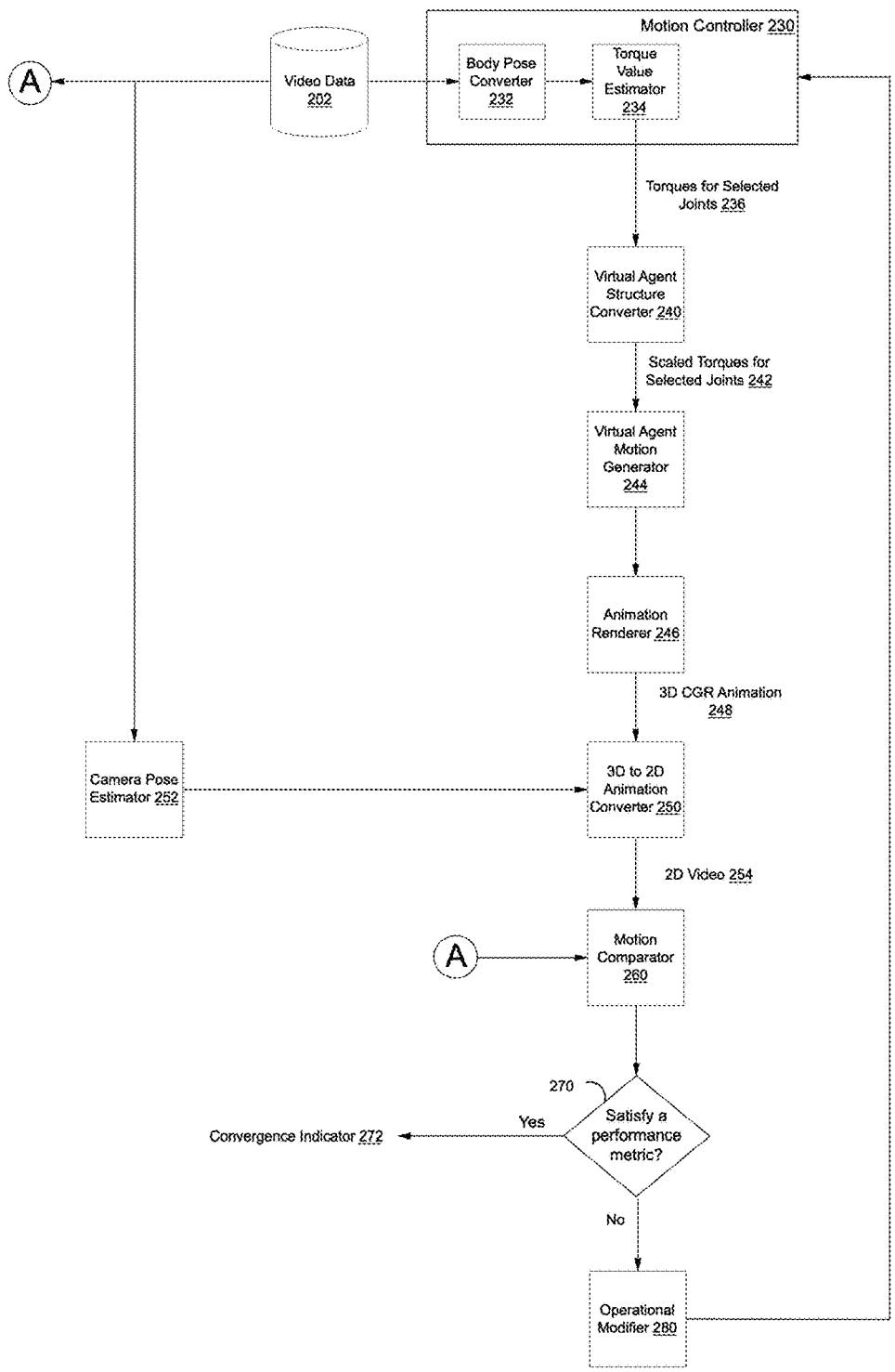
FIG. 2 is a block diagram of an example of a training system for training a motion controller in accordance with some implementations.

FIG. 2 is a block diagram of an example of a training system 200 for training a motion controller 230 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. In some implementations, the training system 200 or components thereof are implemented by the electronic device 100 in FIG. 1. As a non-limiting example, the training system 200 includes video data 202, the motion controller 230, a virtual agent structure converter 240, a virtual agent motion generator 244, an animation renderer 246, a three-dimensional (3D) to two-dimensional (2D) animation converter 250, a camera pose estimator 252, a motion comparator 260, and an operational modifier 280.

According to various implementations, the training system 200 obtains the video data 202, such as from a storage device or from an external network (e.g., the Internet). The video data 202 includes a representation of a first plurality of motions of a real-world entity, such as a real person, a real animal, a real robot, or an animation thereof. For example, the video data 202 includes a representation of an individual walking down a street. The training system 200 provides the video data 202 to the motion controller 230. In some implementations, the video data 202 is characterized by a fixed field-of-view, such as the center position within each of a series of images.

The motion controller 230 includes a torque value estimator 234 that determines, from the video data 202, a plurality of estimated torque values 236 associated with a plurality of real-world joints of the real-world entity corresponding to the first plurality of motions. For example, in some implementations, the torque value estimator 234 utilizes object tracking (e.g., instance segmentations and/or semantic segmentation) in order to determine the plurality of estimated torque values 236. In some implementations, the torque value estimator 234 includes a neural network that implements the object tracking. In some implementations, the plurality of estimated torque values 236 comprise a subset of selected joints of the real-world entity, such as the leg joints of a jumping basketball player. The motion controller 230 provides the plurality of estimated torque values 236 to the virtual agent structure converter 240.

In some implementations, the motion controller 230 utilizes body pose information in determining the plurality of estimated torque values 236. In some implementations, a body pose converter 232 determines, from the video data 202, positional and angular information of the real-world entity, and provides the positional and angular information to the torque value estimator 234. In some implementations, based on the video data 202, the body pose converter 232 generates a body pose model of the real-world entity defined by a branched plurality of neural network systems. Each of the branched plurality of neural network systems models a respective portion of the real-world entity, such as a shoulder joint neural network, knee joint neural network, etc. In some implementations, each of the branched plurality of neural network systems includes a convolution neural network (CNN) and/or a capsule network. The motion controller 230 provides the video data 202 to the branched plurality of neural network systems and determines, via the branched plurality of neural network systems, body pose information of the real-world entity.

In some implementations, the motion controller 230 utilizes granular motion information in determining the plurality of estimated torque values 236. For example, in some implementations, the motion controller 230 obtains an indication of a plurality of granular motions that is respectively associated with the first plurality of motions of the real-world entity. As one example, the granular motion information indicates that at time t0: a first one of the plurality of granularity motions is "lift left leg;" at time t1: a second one of the plurality of granularity motions is "put left leg down;" at time t2: a third one of the plurality of granularity motions is "lift right leg;" etc. In some implementations, the motion controller 230 obtains granular motion information from a supervisor network.

In some implementations, the virtual agent structure converter 240 converts the plurality of estimated torque values 236 in order to account for structural differences between the real-world entity and a virtual agent. For example, when the real-world entity is an adult and the virtual agent is a child, the virtual agent structure converter 240 converts the plurality of estimated torque values 236 associated with the adult according to the shorter limbs of the child as compared with the corresponding limbs of the adult. Thus, the virtual agent structure converter 240 generates a plurality of scaled torque values 242 as a function of the plurality of estimated torque values 236 and structural differences between the real-world entity and the virtual agent. In some implementations, the virtual agent structure converter 240 provides the plurality of scaled torque values 242 to the virtual agent motion generator 244, which, in turn, generates a second plurality of motions of the virtual agent. In some implementations, the training system 200 bypasses operation of the virtual agent structure converter 240 and provides the plurality of estimated torque values 236 directly from the motion controller 230 to the virtual agent motion generator 244, which, in turn, generates the second plurality of motions of the virtual agent.

The training system 200 provides the plurality of estimated torque values 236 to a corresponding plurality of virtual joints of the virtual agent. Movement of the virtual agent is controllable by the plurality of virtual joints, and the plurality of virtual joints corresponds to the plurality of real-world joints of the real-world entity. For example, movement of a left shoulder joint of the real-world entity corresponds to movement of a left shoulder joint of the virtual agent. In various implementations, the virtual agent is configured to perform an action in order to satisfy (e.g., complete or achieve) an objective of the virtual agent. In some implementations, the virtual agent obtains the objective from a human operator (e.g., a user of an electronic device). In some implementations, the virtual agent is pre-configured (e.g., stored in memory) with a set of one or more objectives and thus the virtual agent operates independently of input from the human operator.

In some implementations, based on the second plurality of motions of the virtual agent output from the virtual agent motion generator 244, the animation renderer 246 generates a three-dimensional (3D) computer-generated reality (CGR) animation 248. The 3D CGR animation 248 enables viewing a corresponding CGR environment from a variety of angles so as provide a user an immersive CGR experience. In some implementations, the 3D to 2D animation converter 250 generates 2D video 254 as a function of the 3D CGR animation 248. In some implementations, the 2D video 254 includes flat video data, such as a series or sequence of still images. In some implementations, the 2D video 254 corresponds to a video stream.

In some implementations, the 3D to 2D animation converter 250 cooperates with the camera pose estimator 252 in generating the 2D video 254. The camera pose estimator 252 estimates a camera pose associated with the video data 202. In some implementations, the camera pose estimator 252 determines a location or region within the video data 202 at which a camera that recorded the video data 202 was focused. Based on the estimate from the camera pose estimator 252, the 3D to 2D animation converter 250 matches (e.g., synchronizes) the camera pose (associated with the video data 202) with a pose of a virtual camera associated with the 3D CGR animation 248. Accordingly, respective viewing angles of the video data 202 and the 3D CGR animation 248 match within an error threshold.

The motion comparator 260 compares the first plurality of motions of the real-world entity against the second plurality of motions of the virtual agent. To that end, in some implementations, the motion comparator 260 compares the video data 202, which includes a representation of the first plurality of motions, against the 2D video 254, which includes a representation of the second plurality of motions.

As represented by block 270, the training system 200 determines whether or not a result of the comparison satisfies a performance metric. In accordance with a determination that the result of the comparison between the first plurality of motions and the second plurality of motions satisfies the performance metric, the training system 200 outputs a convergence indicator 272. For example, the convergence indicator 272 indicates that the motion controller 230 has been sufficiently trained for run-time operation. On the other hand, in accordance with a determination that the result of the comparison between the first plurality of motions and the second plurality of motions does not satisfy the performance metric, the training system 200 changes an operational value of the motion controller 230, such as changing weights of a neural network of the motion controller 230.

Figure 3:
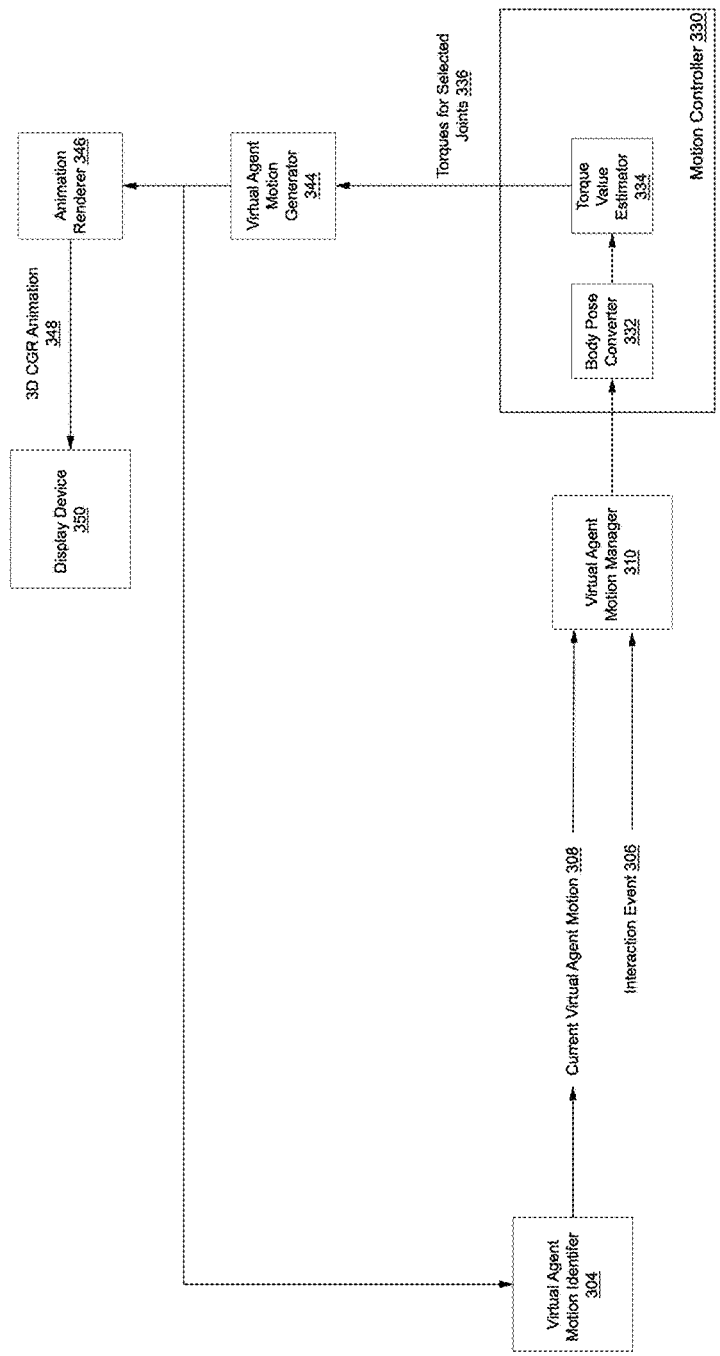
FIG. 3 is a block diagram of an example of a run-time system that generates torque values for a virtual agent in accordance with some implementations.

FIG. 3 is a block diagram of an example of a run-time system 300 that generates torque values for a virtual agent in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. In some implementations, the run-time system 300 or components thereof are implemented by the electronic device 100 in FIG. 1. In some implementations, portions of the run-time system 300 are implemented by corresponding components of the training system 200 in FIG. 2. To that end, as a non-limiting example, the run-time system 300 includes a virtual agent motion identifier 304, a virtual agent motion manager 310, a motion controller 330, a virtual agent motion generator 344, an animation renderer 346, and a display device 350.

In some implementations, the virtual agent motion identifier 304 identifies a current motion 308 of a virtual agent that is display via the display device 350. The virtual agent moves according to a motion type, such as running, jumping, rolling, crawling, stopping, non-motion, etc. For example, the virtual agent motion identifier 304 identifies that a virtual agent is a dog that is running after a car. The virtual agent is defined by a plurality of virtual joints, and the motions of the virtual agent are controllable by providing a corresponding plurality of torques to the plurality of virtual joints. Additional details regarding the virtual agent are provided above with reference to FIG. 2. The virtual agent motion identifier 304 provides the current virtual agent motion 308 to the virtual agent motion manager 310.

While the virtual agent is moving according to the motion type, the virtual agent motion manager 310 registers an interaction event 306 with the virtual agent. The interaction event initiates a change to the motion type. For example, the interaction event 306 is specified via a user input, such a user's hand gesture directed to the virtual agent. As another example, the interaction event 306 is initiated by another virtual agent, such as the other virtual agent throwing a ball at the virtual agent, prompting the virtual agent to attempt to catch the ball. As yet another example, the interaction event 306 results from a perceptible change to a CGR environment, such as a loud noise being played within the CGR environment or ice cracking under the feet of the virtual agent.

In some implementations, in response to registering the interaction event 306, the virtual agent motion manager 310 directs the motion controller 330 to generate a plurality of torque values 336 for the virtual agent. The plurality of torque values 336 is based on a function of the motion type and the interaction event. In some implementations, the motion controller 330 or components thereof are similar to and adapted from corresponding components of the motion controller 230 described above with reference to FIG. 2. Thus, a discussion of operational features of the motion controller 330 is omitted for the sake of brevity. Because the motion controller 330 has been trained with video data representing motions of a real-world entity (as discussed with reference to the training system 200 in FIG. 2), the plurality of torque values 336 for the virtual agent are more physically realistic than other systems which, for example, assemble predetermined animation segments. Moreover, the run-time system 300 enables a particular motion type associated with a real-world entity to be emulated by the virtual agent. For example, the training-system 300 may emulate a distinctive walking gait and posture of a real person by applying estimated torque values to the corresponding virtual joints of the virtual agent.

In some implementations, in response to registering the interaction event 306, the virtual agent motion manager 310 directs the virtual agent motion generator 344 and the animation renderer 346 to collectively generate an animation for the virtual agent. In some implementations, the virtual agent motion generator 344 generates a plurality of motions of the virtual agent based on the plurality of torque values 336. In some implementations, the virtual agent motion generator 344 is similar to and adapted from the virtual agent motion generator 244 in FIG. 2. Thus, a discussion of operational features of the virtual agent motion generator 344 is omitted for the sake of brevity. In some implementations, the animation renderer 346 generates an animation for the virtual agent by providing the plurality of torque values 336 to the plurality of virtual joints of the virtual agent. For example, as illustrated in FIG. 3, the animation renderer 346 generates a 3D CGR animation 348 of the virtual agent based on the plurality of motions determined by the virtual agent motion generator 344. In some implementations, the animation renderer 346 is similar to and adapted from the animation renderer 246 in FIG. 2. Thus, a discussion of operational features of the animation renderer 346 is omitted for the sake of brevity. The 3D CGR animation 348 of the virtual agent is more physical realistic than animations generated by other systems that assemble predetermined animation segments.

The run-time system 300 displays the 3D CGR animation 348 via the display device 350, such as a display panel integrated in a head-mountable device (HMD). As another example, in some implementations, the display device 350 is integrated in a smartphone, tablet, or laptop.

Figure 4A:
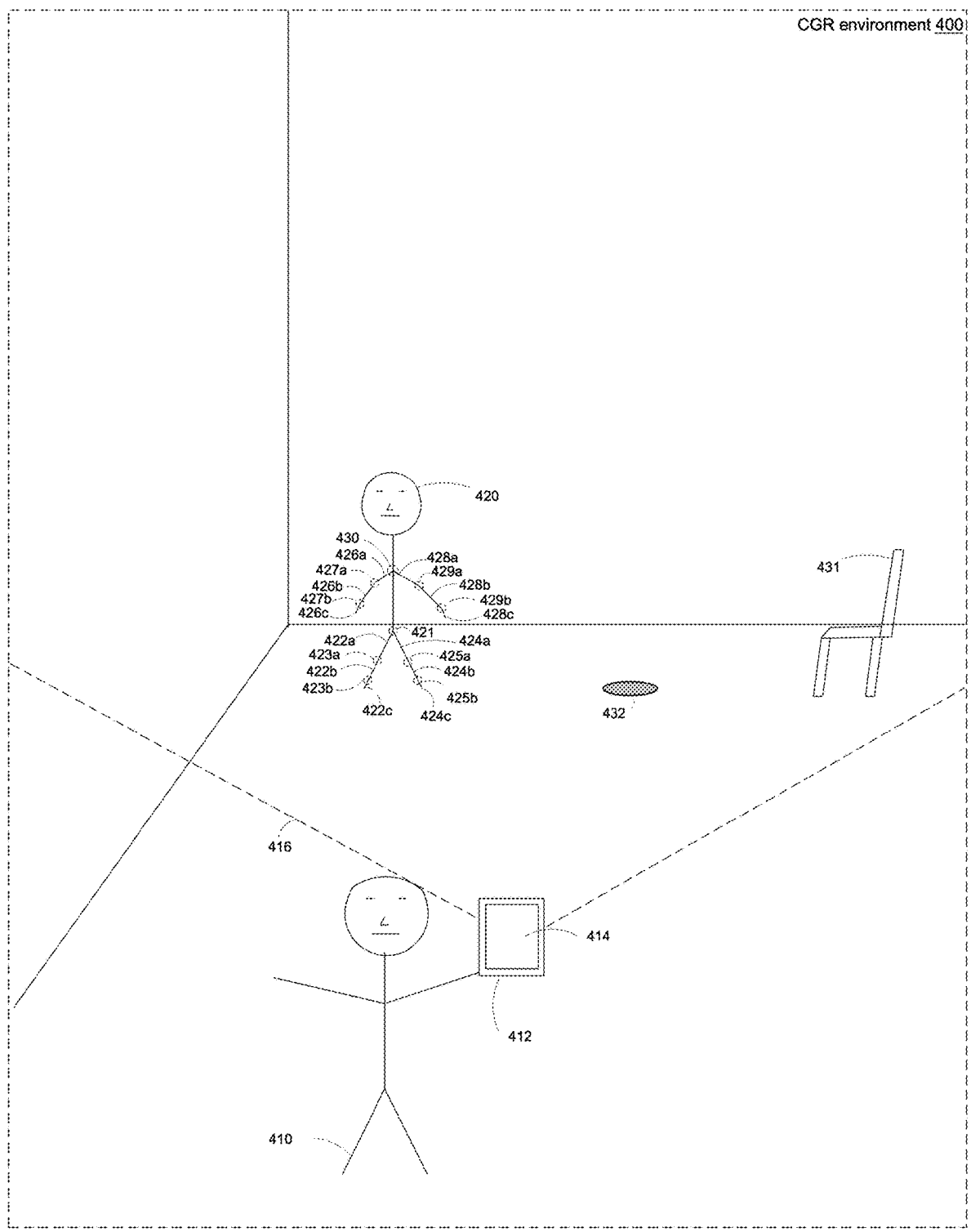
FIGS. 4A-4N are an example of an electronic device generating torque values for a virtual agent as a function of a motion type of the virtual agent and an interaction event in accordance with some implementations.
Figure 4B:
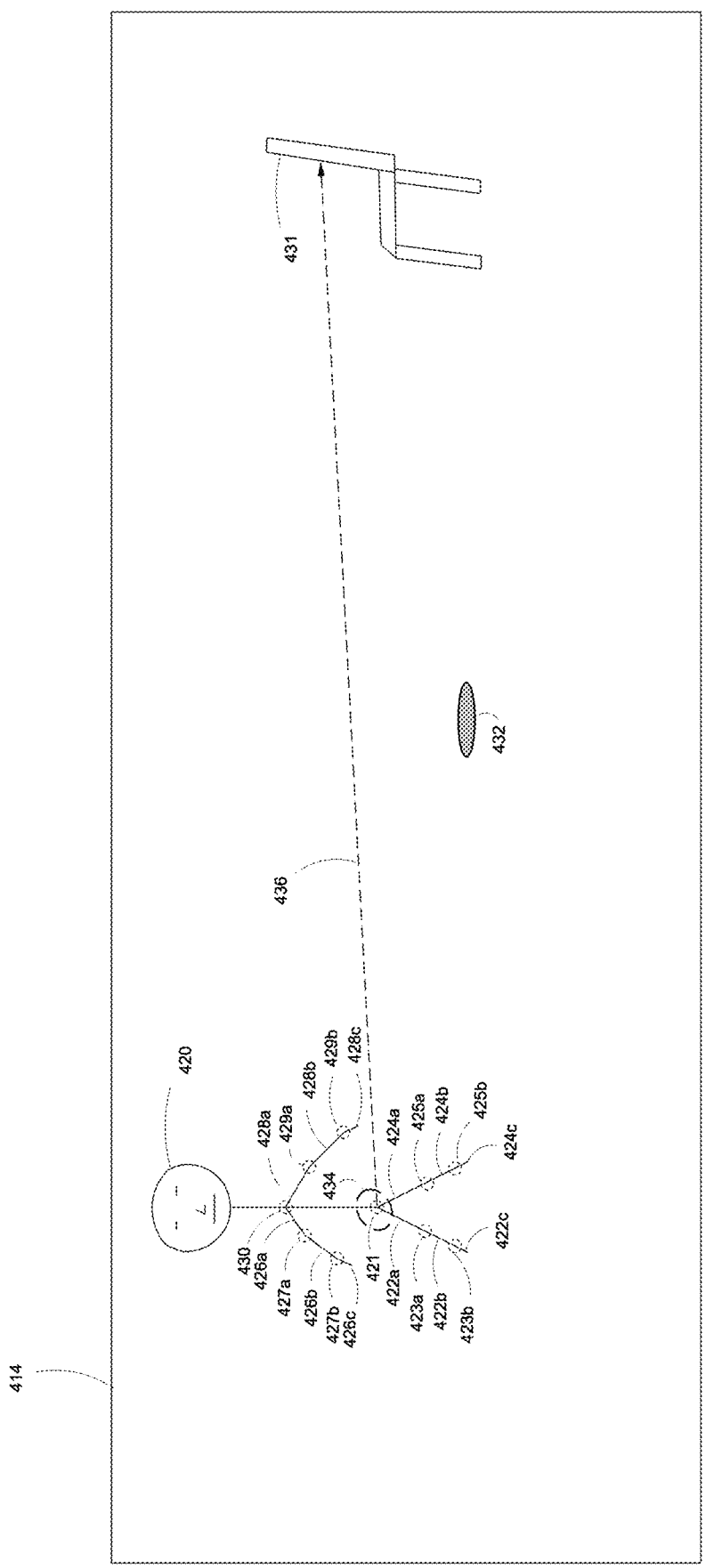
Figure 4C:
Figure 4D:
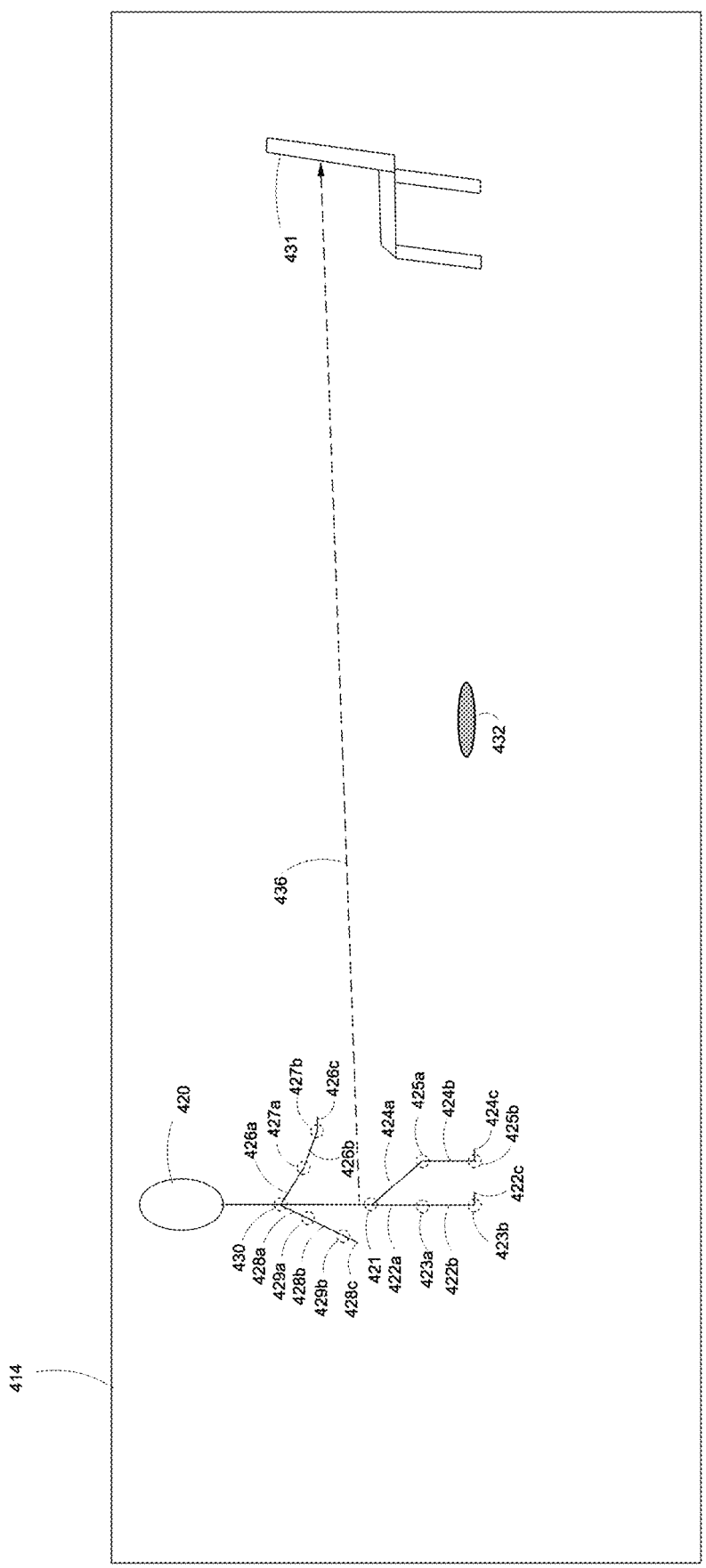
Figure 4E:
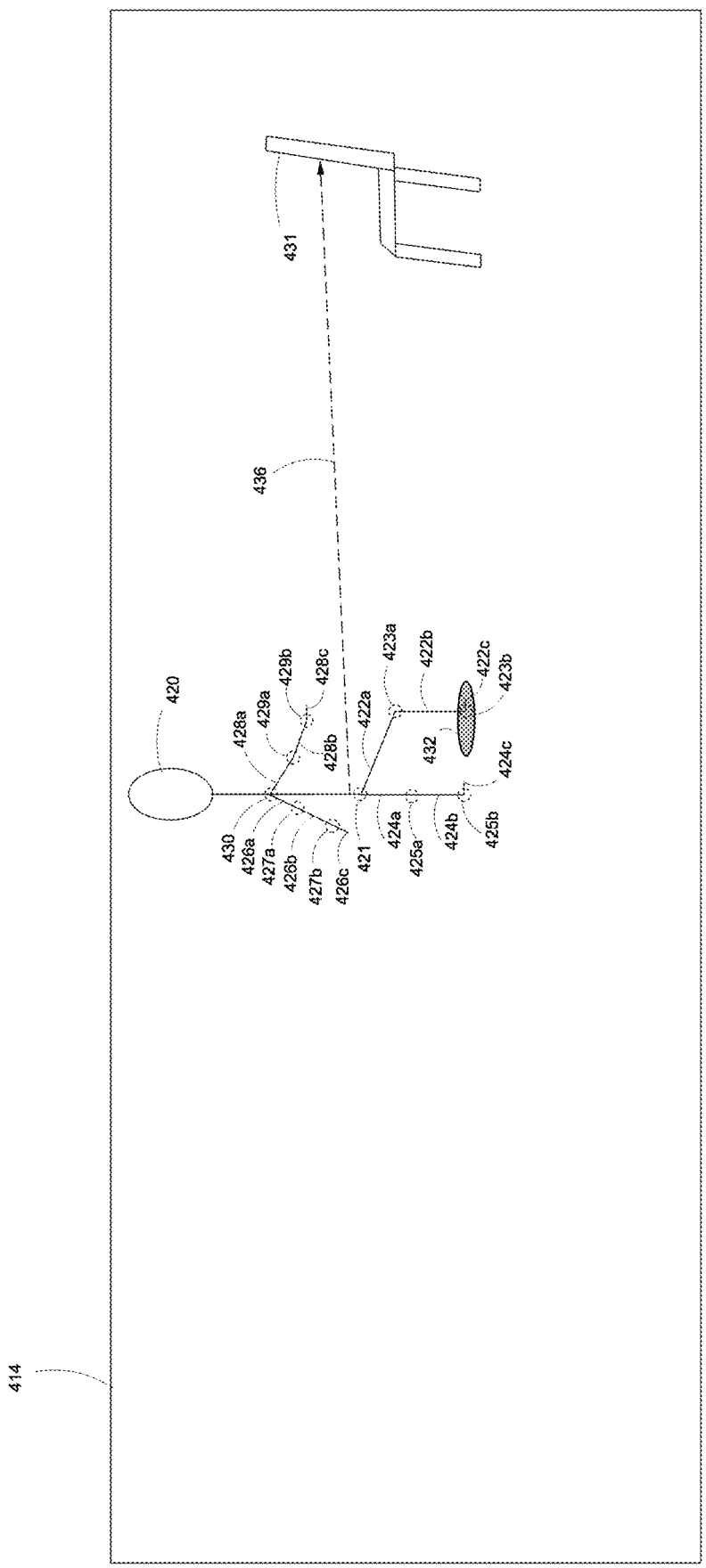
Figure 4F:
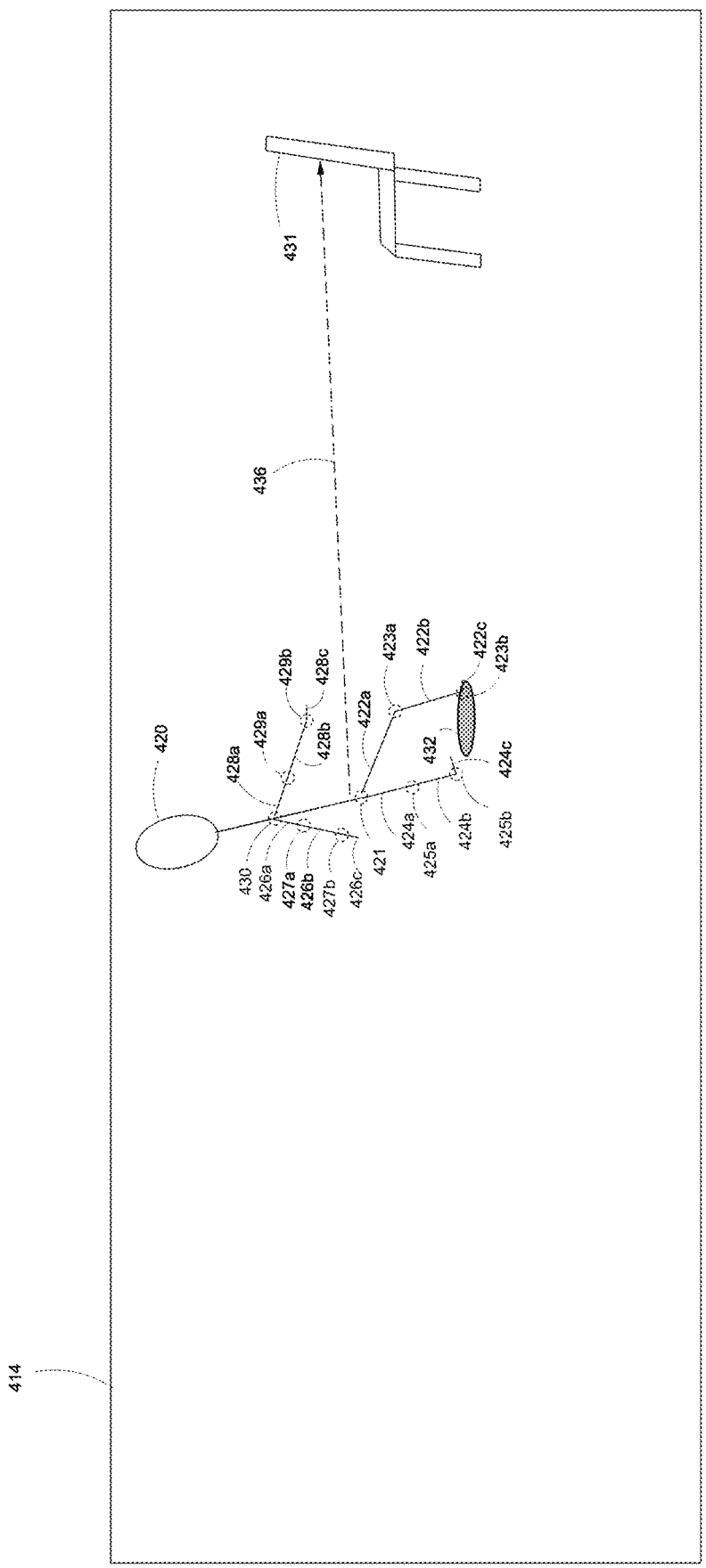
Figure 4G:
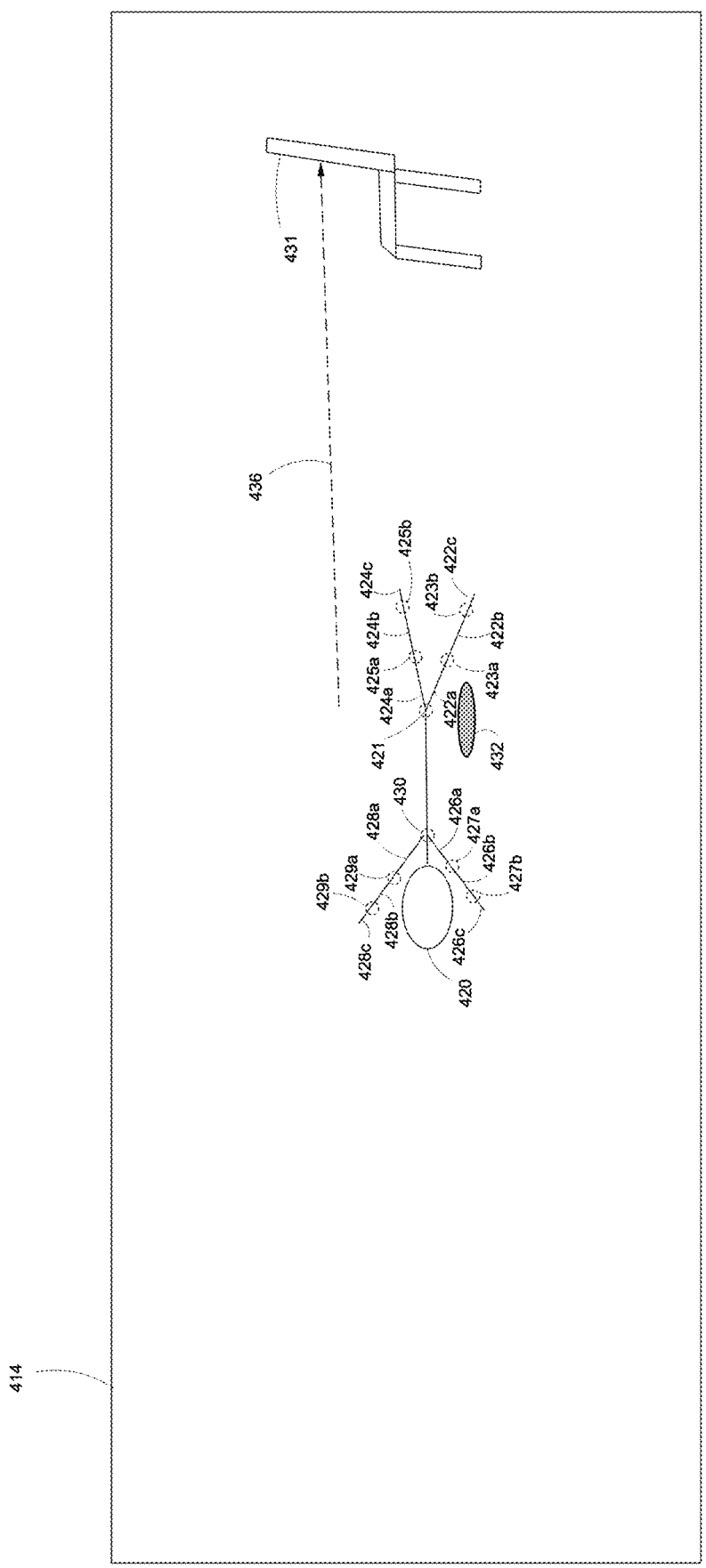
Figure 4H:
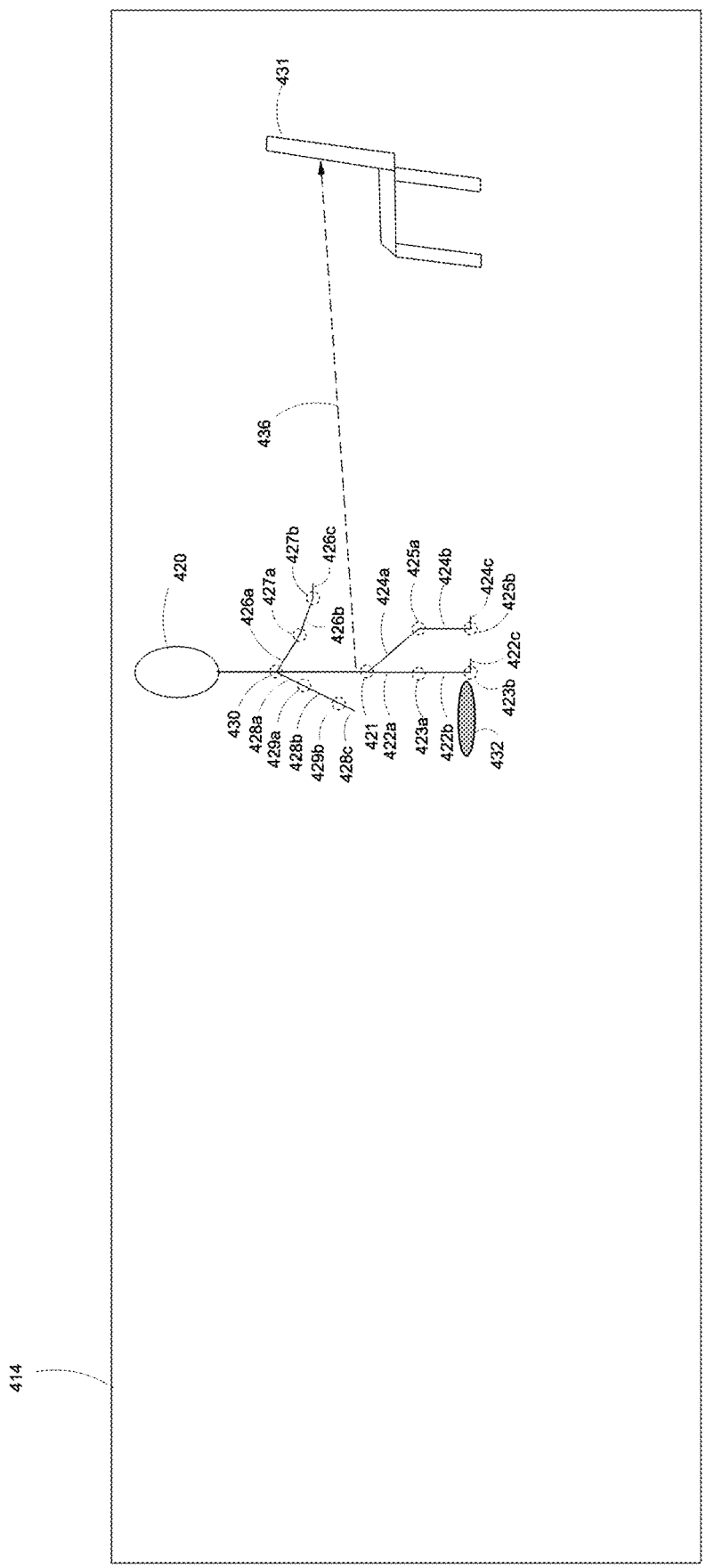
Figure 4I:
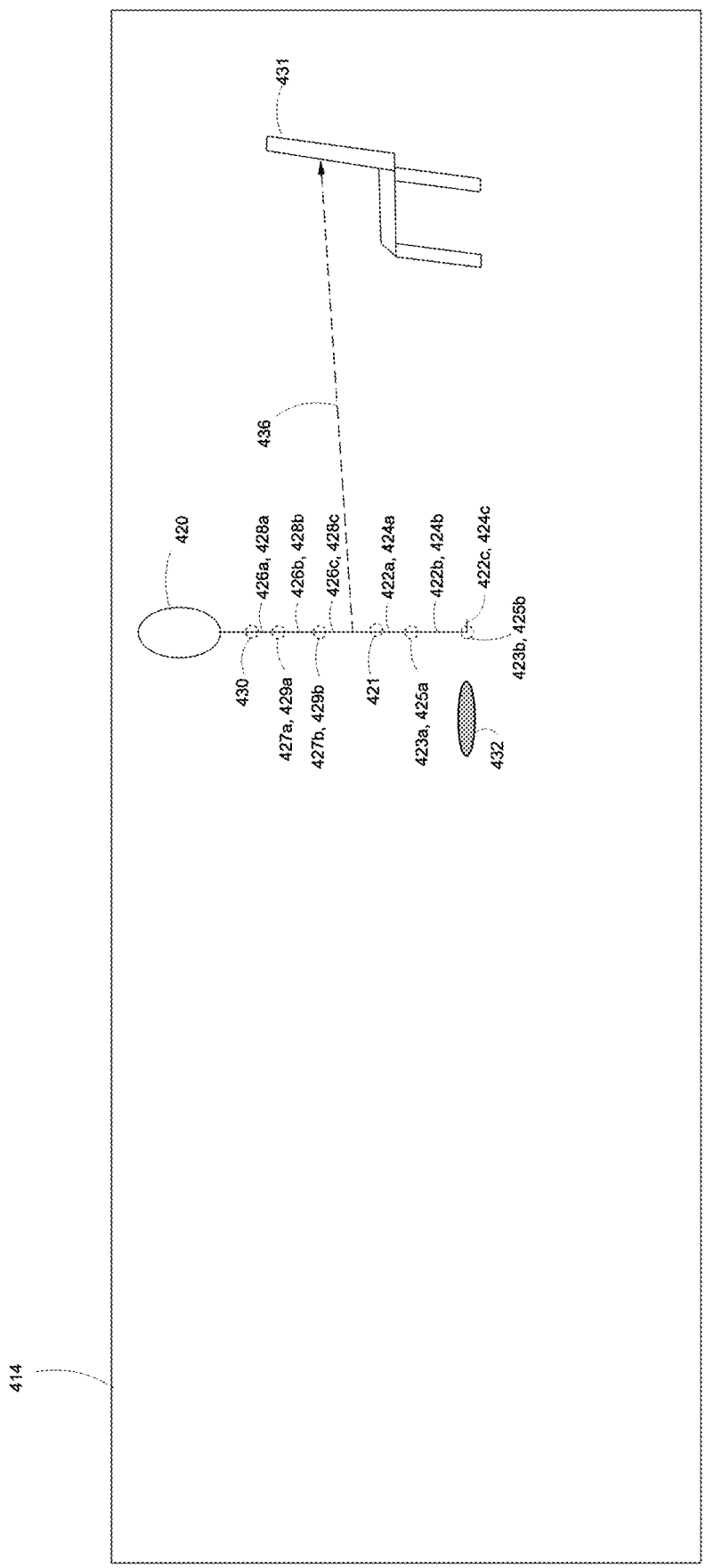
Figure 4J:
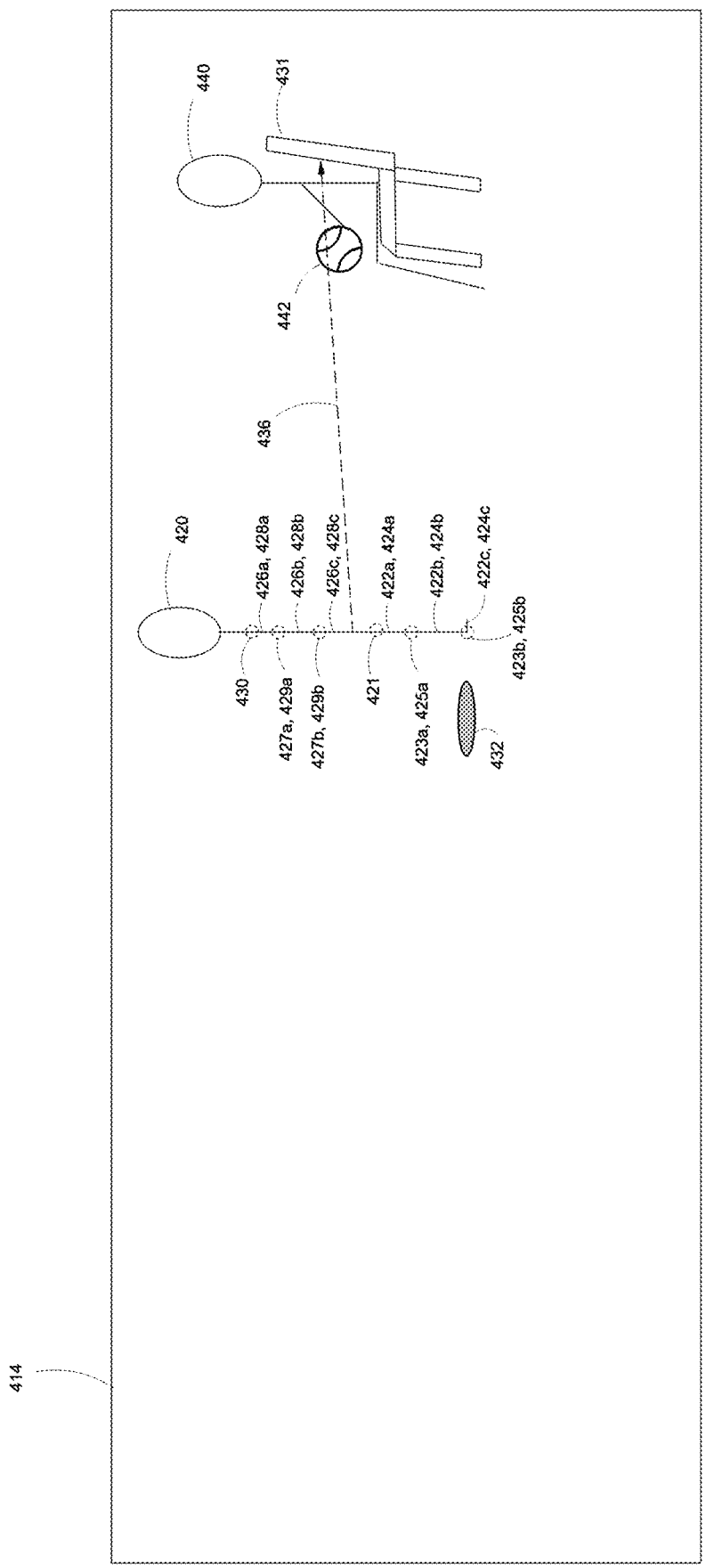
Figure 4K:
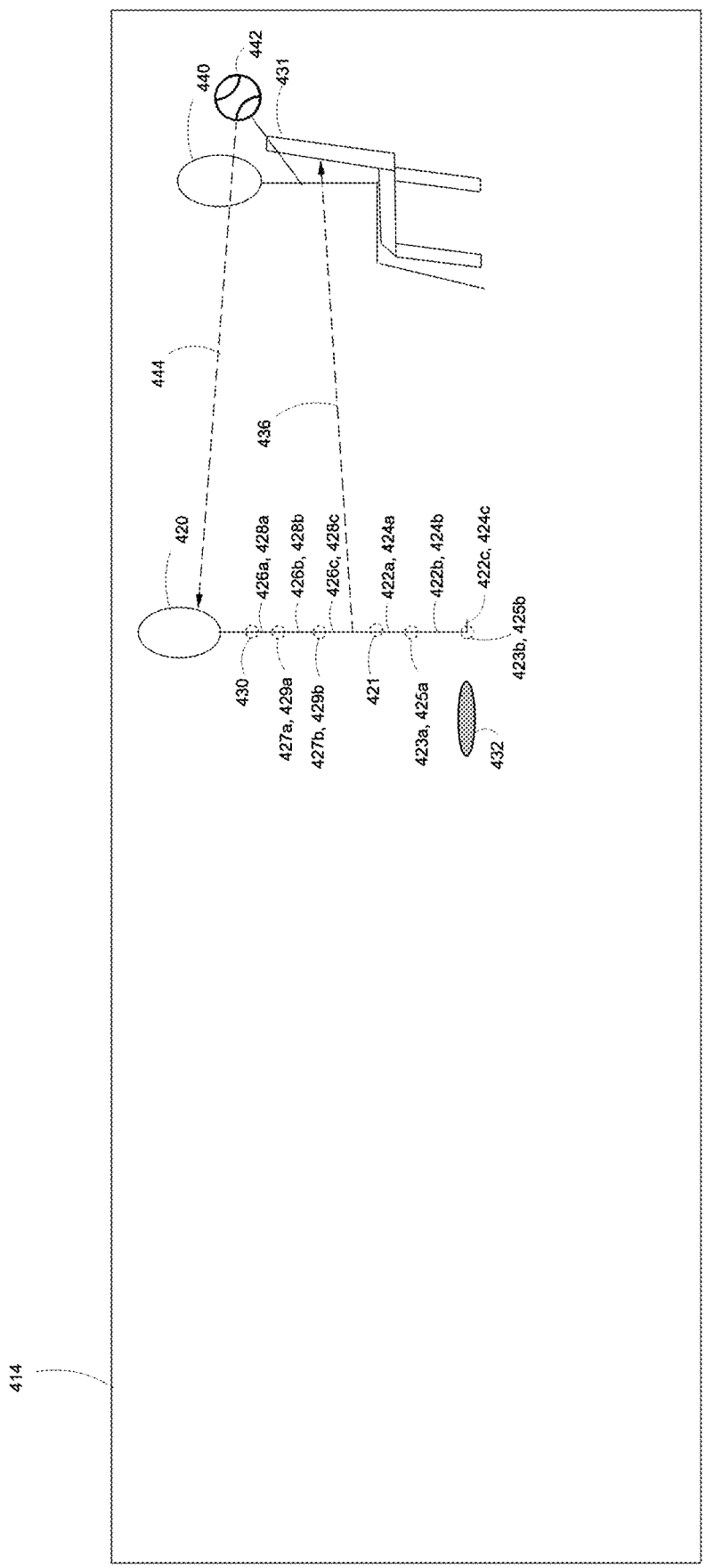
Figure 4L:
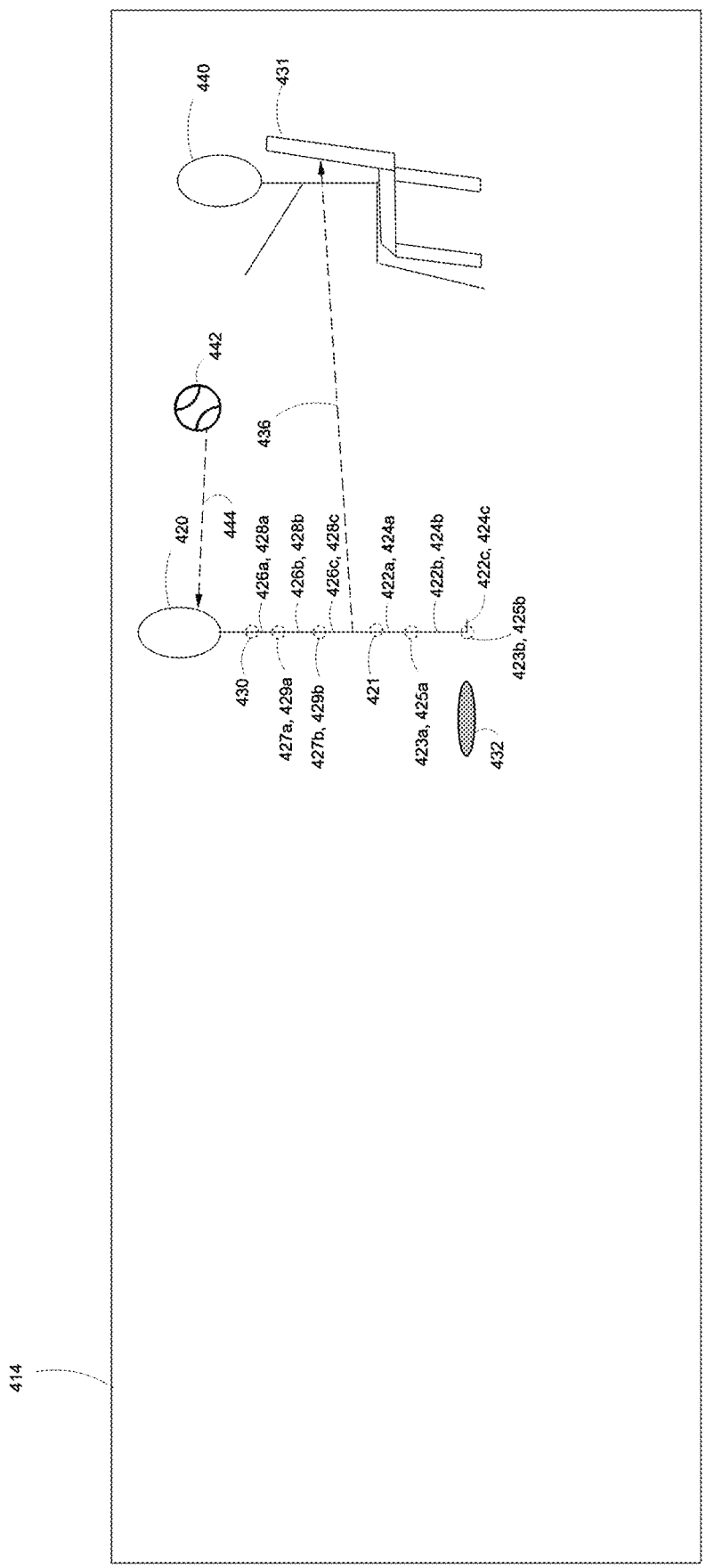
Figure 4M:
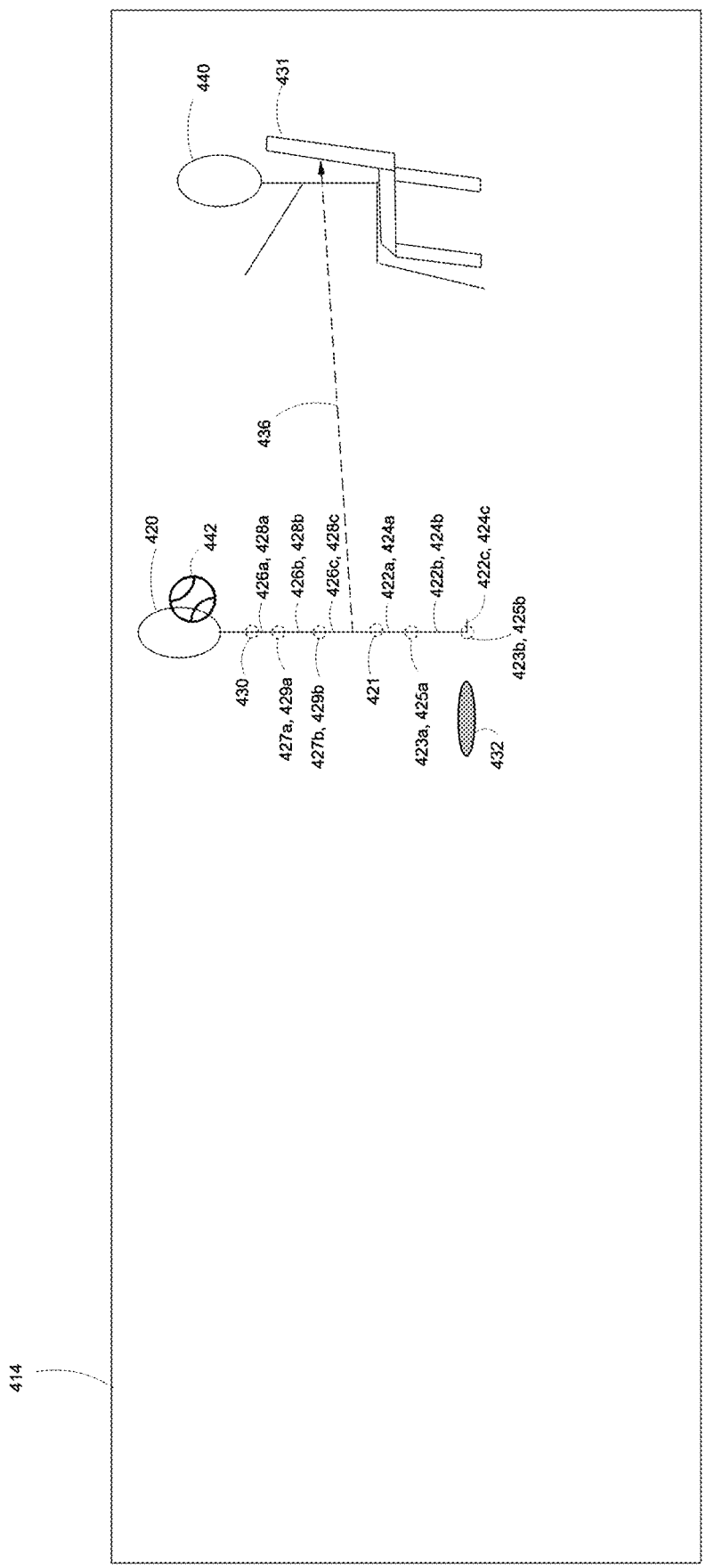
Figure 4N:
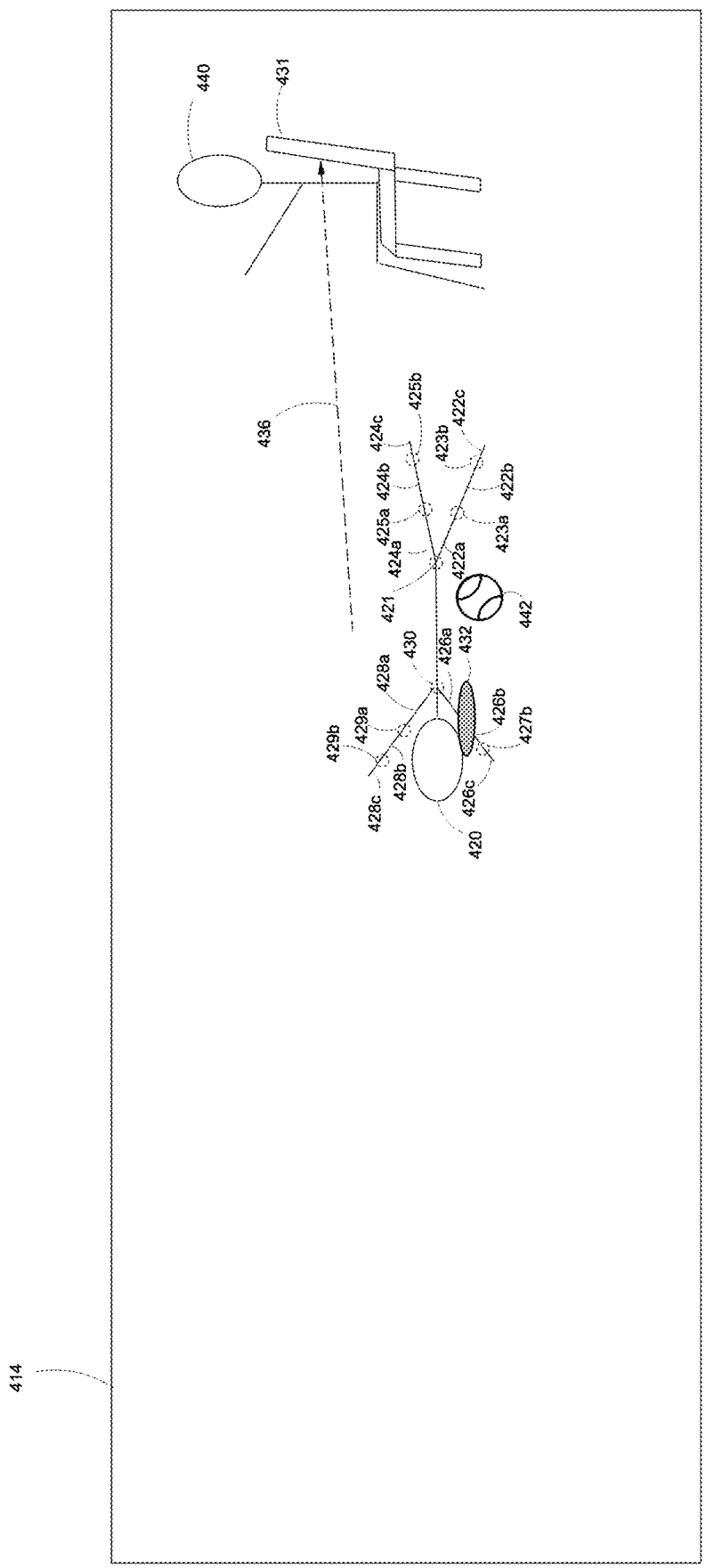

FIGS. 4A-4N are an example of an electronic device 412 generating torque values for a virtual agent 420 as a function of a motion type of the virtual agent 420 and an interaction event in accordance with some implementations. As illustrated in FIG. 4A, a user 410 is holding the electronic device 412. In some implementations, the electronic device 412 corresponds to a mobile device, such as a smartphone, laptop, tablet, etc. In some implementations, the electronic device 412 is similar to and adapted from the electronic device 100 in FIG. 1. In some implementations, the electronic device 412 implements functionality described with reference to the run-time system 300 in FIG. 3.

According to various implementations, the electronic device 412 displays, via a display device 414 included in the electronic device 412, a CGR environment 400 that includes a virtual agent 420, an CGR ice patch 432, and an CGR chair 431. According to various implementations, the electronic device 412 changes a motion of the virtual agent 420 based on interactions with the virtual agent 420.

In some implementations, the CGR environment 400 corresponds to a pure virtual reality (VR) environment, which is independent of features of a physical (e.g., real-world) environment associated with the electronic device 412. For example, the CGR ice patch 432 and the CGR chair 431 are both virtual (e.g., computer-generated) objects.

In some implementations, the CGR environment 400 corresponds to an augmented reality (AR) environment that includes virtual objects as well as physical features of a physical environment. Accordingly, in some implementations, the CGR ice patch 432 is a real ice patch and the CGR chair 431 is a real chair. According to various implementations, the electronic device 412 utilizes instance segmentation or semantic segmentation in order to identify the physical objects. In some implementations, the electronic device 412 includes an image sensor that obtains image data representative of the physical environment. In some implementations, the image sensor is associated with a field-of-view 416 defined by a portion of the physical environment.

In some implementations, the electronic device 412 corresponds to a head-mountable device (HMD) that includes an integrated display (e.g., a built-in display) that displays the CGR environment 400. In some implementations, the electronic device 412 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., a mobile device, such as a smartphone). For example, in some implementations, an electronic device slides/snaps into or otherwise attaches to the head-mountable enclosure. In some implementations, the display of the device attached to the head-mountable enclosure presents (e.g., displays) the CGR environment 400. For example, in some implementations, an electronic device corresponds to a mobile phone that can be attached to the head-mountable enclosure. In various implementations, examples of the electronic device include smartphones, tablets, media players, laptops, etc.

As illustrated in FIG. 4A, the virtual agent 420 corresponds to a virtual person. One of ordinary skill in the art will appreciate that, in some implementations, the virtual agent 420 corresponds to a different virtual entity, such as a virtual animal, virtual robot, etc. The virtual agent 420 includes a neck joint 430, a left upper arm joint 429a, a left lower arm joint 429b, a right upper arm joint 427a, a right lower arm joint 427b, a hip joint 421, a left knee joint 425a, a left foot joint 425b, a right knee joint 423a, and a right foot joint 423b. The dotted circles indicating the various joints are illustrated for purely explanatory purposes. One of ordinary skill in the art will appreciate that, in some implementations, the electronic device 412 targets a different set of joints of the virtual agent 420 in order to change motions of the virtual agent 420. Moreover, the virtual agent 420 includes a left upper arm 428a, a left forearm 428b, a left hand 428c, a right upper arm 426a, a right forearm 426b, a right hand 426c, a left thigh 424a, a left shin 424b, a left foot 424c, a right thigh 422a, a right shin 422b, and a right foot 422c.

As described above with reference to FIG. 3, the electronic device 412 registers an interaction event with the virtual agent 420 that initiates a change to a motion type of the virtual agent 420. Namely, as illustrated in FIG. 4B, the electronic device 412 detects an input 434 directed to the virtual agent 420. The input 434 requests the virtual agent 420 move towards the CGR chair 431, as indicated by a motion line 436. The motion line 436 is illustrated for purely explanatory purposes. As one example, the input 434 corresponds to an extremity gesture of the user 410 that contacts the virtual agent 420 and swipes rightwards towards the CGR chair 431, wherein the electronic device 412 includes an extremity tracker that tracks the extremity gesture.

In response to registering the interaction event, the electronic device 412 generates a plurality of torque values for the virtual agent 420 based on a function of the motion type and the interaction event (e.g., the virtual agent 420 is directed to walk towards the CGR chair 431), and generates an animation for the virtual agent by providing the plurality of torque values to the plurality of virtual joints of the virtual agent 420. Namely, as illustrated in FIGS. 4C-4I, the display device 414 displays the animation that includes the virtual agent 420 moving towards the CGR chair 431.

As illustrated in FIG. 4C, the virtual agent 420 has turned towards the CGR chair 431, the destination of the current motion of the virtual agent 420. The arms and legs of the virtual agent 420 are in a substantially straight line because the virtual agent 420 has not yet begun to take a step towards the CGR chair 431.

As illustrated in FIG. 4D, the virtual agent 420 has started taking a step forward with the left foot 424c towards the CGR chair 431. Accordingly, as compared with FIG. 4C, the electronic device 412 changes respective angles of the hip joint 421 and the left knee joint 425a. Additionally, the right arm (426a-426c) of the virtual agent 420 is swinging forward, while the left arm (428a-428c) is behind the torso of the virtual agent 420. Accordingly, as illustrated in FIG. 4D, the electronic device 412 manipulates display of joints 427a-427b and 429a-429b respectively associated with the right arm and left arm.

As illustrated in FIG. 4E, the virtual agent 420 has moved even closer to the CGR chair 431. The virtual agent 420 is stepping forward with the right foot 422c. However, the right foot 422c is stepping on (e.g., contacting) the CGR ice patch 432. Accordingly, the electronic device 412 registers an interaction event with the virtual agent 420 because the electronic device 412 determines that the contact with the CGR ice patch 432 results in a change in motion of the virtual agent 420. In response to registering the interaction event in FIG. 4E, the electronic device 412 generates a plurality of torque values for the virtual agent 420 based on a function of the motion type and the interaction event (e.g., stepping on the CGR ice patch 432), and generates an animation for the virtual agent by providing the plurality of torque values to the plurality of virtual joints of the virtual agent 420. Namely, the animation changes from the virtual agent 420 moving towards the CGR chair 431 to the virtual agent 420 beginning to slip on the CGR ice patch 432 in FIG. 4F and falling to the ground in FIG. 4G.

As illustrated in FIGS. 4H and 4I, the virtual agent 420 has gotten up from the fall and resumed walking towards the CGR chair 431. However, as illustrated in FIG. 4J, the display device 414 displays another virtual agent 440 sitting on the CGR chair 431 and holding an CGR baseball 442. Accordingly, the electronic device 412 registers an interaction event with the virtual agent 420 because the electronic device 412 determines that the other virtual agent 440 sitting on the CGR chair 431 precludes the virtual agent 420 from being able to sit on the CGR chair 431. In response to registering the interaction event in FIG. 4J, the electronic device 412 generates a plurality of torque values for the virtual agent 420 based on a function of the motion type and the interaction event (e.g., the other virtual agent 440 sitting on the CGR chair 431), and generates an animation for the virtual agent by providing the plurality of torque values to the plurality of virtual joints of the virtual agent 420. Namely, the animation changes from the virtual agent 420 moving towards the CGR chair 431, as illustrated in FIGS. 4H and 4I, to the virtual agent 420 stopping in FIG. 4J and remaining stopped throughout FIGS. 4K-4M.

As illustrated in FIG. 4K, the other virtual agent 440 is beginning to throw the CGR baseball 442 towards the head of the virtual agent 420. The path of the CGR baseball 442 is shown with a path line 444, which is illustrated in FIGS. 4K and 4L for purely explanatory purposes. As illustrated in FIG. 4L, the CGR baseball 442 is closer to the head of the virtual agent 420. The CGR baseball 442 contacts the head of the virtual agent 420 in FIG. 4M.

Accordingly, the electronic device 412 registers an interaction event with the virtual agent 420 because the electronic device 412 determines that the CGR baseball 442 contacting the virtual agent 420 in FIG. 4M results in the change in motion of the virtual agent 420. In response to registering the interaction event in FIG. 4M, the electronic device 412 generates a plurality of torque values for the virtual agent 420 based on a function of the motion type and the interaction event (e.g., the CGR baseball 442 contacting the virtual agent 420), and generates an animation for the virtual agent by providing the plurality of torque values to the plurality of virtual joints of the virtual agent 420. Namely, the animation changes from the virtual agent 420 standing up in FIG. 4M to the virtual agent 420 again falling to the ground, as is illustrated in FIG. 4N.

Figure 5:
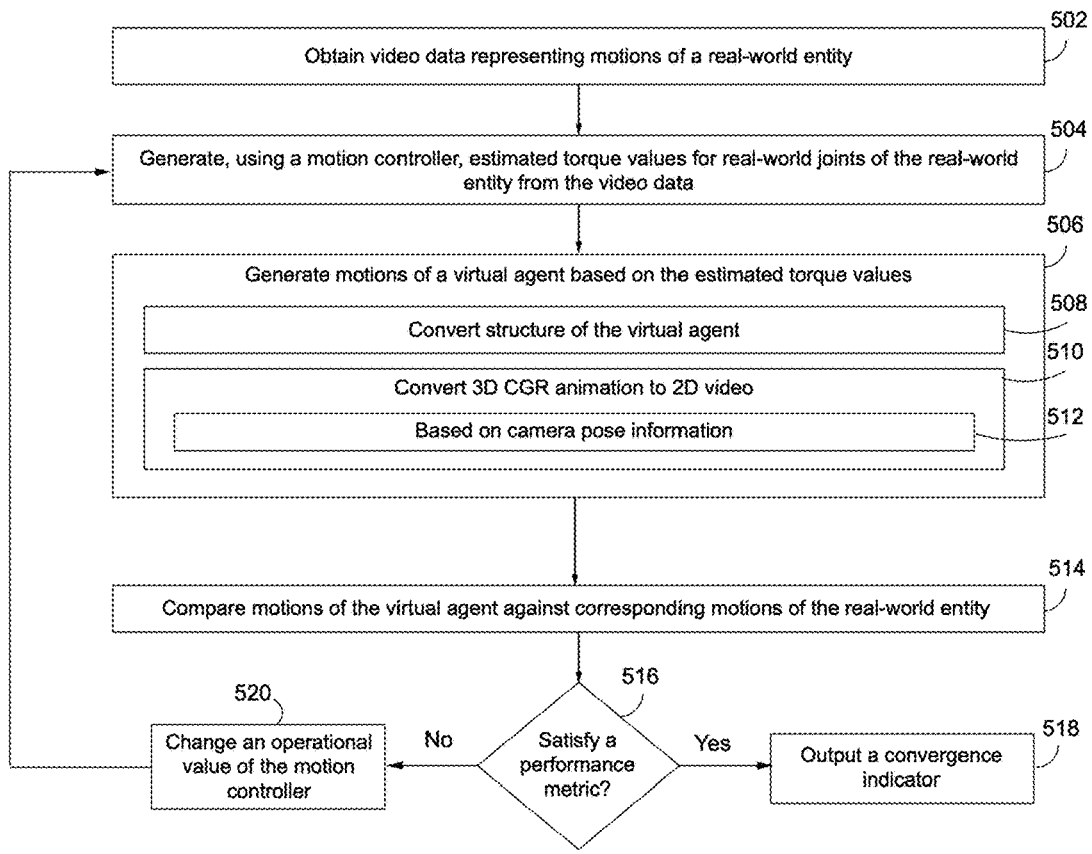
FIG. 5 is an example of a block diagram of a method of training a motion controller in accordance with some implementations.

FIG. 5 is an example of a block diagram of a method 500 of training a motion controller in accordance with some implementations. In various implementations, the method 500 or portions thereof are performed by an electronic device (e.g., the electronic device 100 in FIG. 1). In various implementations, the method 500 or portions thereof are performed by a training system (e.g., the training system 200 in FIG. 2). In some implementations, the method 500 is performed by processing logic, including hardware, firmware, software, or a combination thereof. In some implementations, the method 500 is performed by a processor executing code stored in a non-transitory computer-readable medium (e.g., a memory). In various implementations, some operations in method 500 are, optionally, combined and/or the order of some operations is, optionally, changed.

As represented by block 502, the method 500 includes obtaining video data (e.g., the video data 202 in FIG. 2) that includes a representation of a first plurality of motions of a real-world entity. For example, the real-world entity is one of a physical human, a physical animal, a physical machine (e.g., robot), or an animation thereof. As another example, the first plurality of motions includes walking, running, crawling, jumping, pausing motion, turning, squatting, etc. As yet another example, the first plurality of motions includes a sequential combination of motions, such as walking, then crawling, and then running. In some implementations, the video data includes a plurality of sequential video frames including the representation of the real-world entity. For example, the plurality of sequential video frames is characterized by a plurality of different types of visual perspectives of the real-world entity. As one example, the plurality of sequential video frames includes a representation of a person running from different angles (e.g., looking down on the runner, looking up at the runner, looking level towards the runner, etc.). In some implementations, the video data includes representations of environmental features associated with the real-world entity. For example, the environmental features include a representation of an object that is proximate to a real-world entity, such as a wall in front of the real-world entity and thus blocking the real-world entity.

As represented by block 504, the method 500 includes determining (e.g., extracting), from the video data, a plurality of estimated torque values using a motion controller, such as via the motion controller 230 in FIG. 2. The plurality of estimated torque values is associated with a plurality of real-world joints of the real-world entity corresponding to the first plurality of motions. In some implementations, the method 500 includes utilizing object tracking via instance segmentation and/or semantic segmentation in order to determine the plurality of estimated torque values. To that end, in some implementations, the motion controller utilizes one or more of: linear regression subsystem, logistic regression subsystem, naïve Bayes subsystem, small neural network subsystem, deep learning neural network subsystem, SVM subsystem, SVM RBF subsystem, SVM linear subsystem, SVM polynomial subsystem, SVM sigmoid subsystem, random forest (Gini) subsystem, random forest (entropy) subsystem, etc. In some implementations, the plurality of estimated torque values is at least in part a function of the representations of environmental features associated with the real-world entity. For example, a table is blocking a walking path of a person, and thus the person has to take a half stride (before sitting on the chair) in order to avoid bumping into the table.

In some implementations, the motion controller generates the plurality of estimated torque values as a function of body pose information, such as obtained from the body pose converter 232 in FIG. 2. For example, the body pose information indicates a first body pose at a first time and a second body pose at a second time. To that end, in some implementations, the method 500 includes generating, based on the video data, a body pose model of the real-world entity defined by a branched plurality of neural network systems, wherein each of the branched plurality of neural network systems models a respective portion of the real-world entity. Moreover, the method 500 may include providing the video data to the branched plurality of neural network systems, and determining, by the branched plurality of neural network systems, body pose information of the real-world entity.

In some implementations, the motion controller generates the plurality of estimated torque values as a function of a plurality of granular motions. To that end, in some implementations, the method 500 includes obtaining an indication of the plurality of granular motions that is respectively associated with the first plurality of motions of the real-world entity. For example, each of the plurality of granularity motions is sequentially related to each other, such as at time t0: a first one of the plurality of granularity motions is "lift left leg;" at time t1: a second one of the plurality of granularity motions is "put left leg down;" at time t2: a third one of the plurality of granularity motions is "lift right leg;" etc.

As represented by block 506, the method 500 includes generating a second plurality of motions of a virtual agent by providing the plurality of estimated torque values to a corresponding plurality of virtual joints of the virtual agent. Movement of the virtual agent is controllable by the plurality of virtual joints. The plurality of virtual joints corresponds to the plurality of real-world joints of the real-world entity. For example, with reference to FIG. 2, the virtual agent motion generator 244 generates the second plurality of motions based on the plurality of estimated torque values 236 from the motion controller 230. In some implementations, each of the plurality of virtual joints of the virtual agent connects at least two member portions. For example, an elbow joint connects a forearm to an upper arm.

In some implementations, as represented by block 508, the method 500 includes generating, from the plurality of estimated torque values, a plurality of scaled estimated torque values as a function of the plurality of real-world joints of the real-world entity and the corresponding plurality of virtual joints of the virtual agent. Generating the second plurality of motions of the virtual agent is based on the plurality of scaled estimated torque values. For example, with reference to FIG. 2, the virtual agent structure converter 240 generates the plurality of scaled estimated torque values 242 from the plurality of estimated torque values 236. As one example, the virtual agent structure converter 240 scales down the plurality of estimated torque values associated with a real-world entity because the virtual agent has shorter limbs.

In some implementations, as represented by block 510, the method 500 includes converting a 3D CGR animation of the virtual agent to a 2D video of the virtual agent. For example, with reference to FIG. 2, the 3D to 2D animation converter 250 obtains, from the animation renderer 246, a 3D CGR animation 248. The 3D to 2D animation converter 250 converts the 3D CGR animation 248 to a 2D video 254. In some implementations, as represented by block 512, converting the 3D CGR animation of the virtual agent to the 2D video of the virtual agent is a function of camera pose information associated with the video data. For example, with reference to FIG. 2, the 3D to 2D animation converter 250 converts the 3D CGR animation 248 to 2D video 254 based on camera pose information from the camera pose estimator 252. Accordingly, the method 500 enables orienting a virtual camera associated with the 2D video 254 associated with the virtual agent similarly (e.g., pointed at the same portion within a sequence video frames) to a physical camera that obtained the video data 202 associated with the real-world entity.

As represented by block 514, the method 500 includes comparing the first plurality of motions of the real-world entity against the second plurality of motions of the virtual agent. As represented by block 516, in some implementations, the method 500 includes determining whether or not a result of the comparison satisfies a performance metric. In some implementations, the performance metric is satisfied when a threshold number of a portion of first plurality of motions matches a corresponding portion of the second plurality of motions within an error threshold.

In accordance with a determination that the result of the comparison between the first plurality of motions and the second plurality of motions satisfies the performance metric, the method 500 includes outputting a convergence indicator associated with the motion controller, as represented by block 518. With reference to FIG. 2, the convergence indicator 272 may indicate that the training system 200 has sufficiently trained the motion controller 230 and thus that the motion controller 230 is ready to operate in run-time mode, the operation of which is illustrated in FIG. 3 (the motion controller 330) and FIG. 6.

On the other hand, in accordance with a determination that a result of the comparison between the first plurality of motions and the second plurality of motions does not satisfy the performance metric, the method 500 includes changing an operational value of the motion controller, as represented by block 520. For example, changing the operational value includes changing values of weights of a neural network. In some implementations, after changing the operational value of the motion controller, the method 500 reverts back to a portion of the method 500 represented by block 504.

Figure 6:
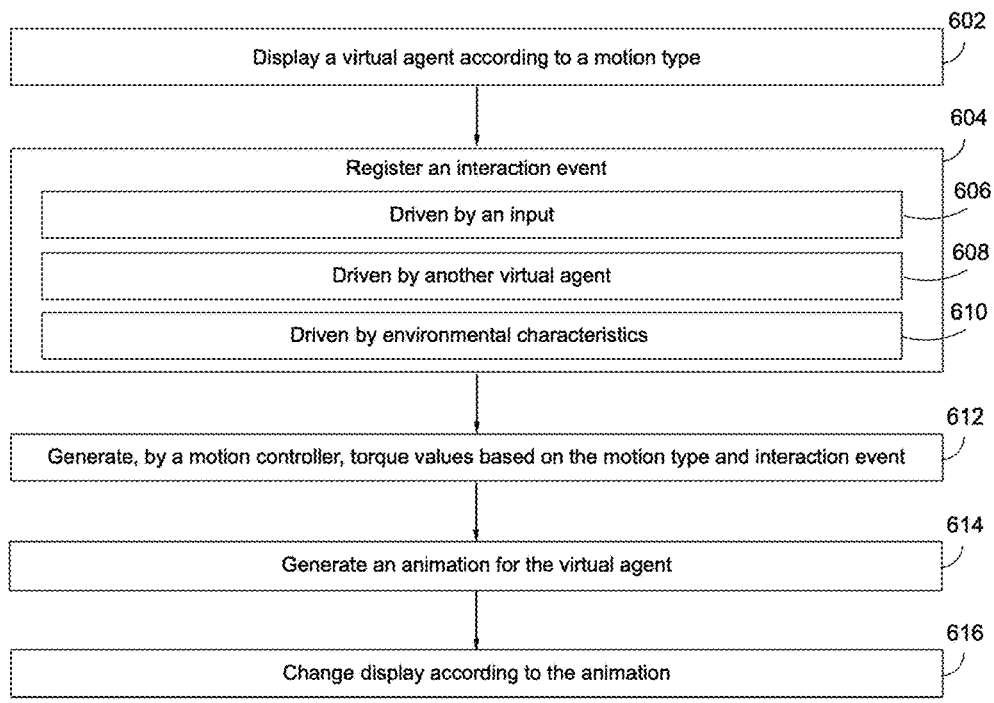
FIG. 6 is an example of a block diagram of a method of operating a motion controller in run-time mode in accordance with some implementations.

FIG. 6 is an example of a block diagram of a method 600 of operating a motion controller in run-time mode in accordance with some implementations. In various implementations, the method 600 or portions thereof are performed by an electronic device (e.g., the electronic device 100 in FIG. 1 or the electronic device 412 in FIGS. 4A-4N). In various implementations, the method 600 or portions thereof are performed by a run-time system (e.g., the run-time system 300 in FIG. 3). In some implementations, the method 600 is performed by processing logic, including hardware, firmware, software, or a combination thereof. In some implementations, the method 600 is performed by a processor executing code stored in a non-transitory computer-readable medium (e.g., a memory). In various implementations, some operations in method 600 are, optionally, combined and/or the order of some operations is, optionally, changed.

As represented by block 602, the method 600 includes displaying, via a display device, a virtual agent moving according to a motion type (e.g., the current virtual agent motion 308 in FIG. 3). The virtual agent is defined by a plurality of virtual joints. Motions of the virtual agent are controllable by providing a corresponding plurality of torques to the plurality of virtual joints. For example, the motion type is one of running, walking, stopping, crouching, punching, kicking, jumping, etc. As one example, with reference to FIG. 4D, the display device 414 is displaying the virtual agent 420 walking towards the CGR chair 431. As represented by block 604, the method 600 includes, while the virtual agent is moving according to the motion type, registering an interaction event with the virtual agent. The interaction event initiates a change to the motion type. For example, with reference to FIG. 3, the virtual agent motion manager 310 registers the interaction event 306 with the virtual agent.

In some implementations, as represented by block 606, registering the interaction event includes receiving, via an input device included in the electronic device, an input directed to the virtual agent. For example, the input requests the virtual agent, which is currently moving, to slow down or stop. As another example, the input specifies the virtual agent, which is currently stationary, to start moving and/or start moving in a particular way (e.g., crawl, walk, run, etc.). As yet another example, the input corresponds to requesting a virtual dog to fetch a ball, such as by the throwing a stick over the virtual dog's head. In some implementations, the input is spatially directed to the virtual agent. As one example, with reference to FIG. 4B, the electronic device 412 detects an input 434 that spatially contacts the virtual agent 420 (e.g., a user's finger touches the virtual agent 420) and requests the virtual agent 420 to move towards the CGR chair 431. As another example, the input is a hand motion that contacts or is proximate to the virtual agent and swipes in a certain direction in order to request the virtual agent move in that direction. In some implementations, the input corresponds to a user input, such as a user extremity input or user eye gaze input.

In some implementations, as represented by block 608, the interaction event corresponds to another virtual agent interacting with the virtual agent. For example, with reference to 4I-4K, in response to determining that the other virtual agent 440 is sitting on the CGR chair 431, the electronic device 412 directs the virtual agent 420 to stop walking towards the CGR chair 431 because the virtual agent 420 can no longer sit on the CGR chair 431. As another example, with reference to 4K-4N, the interaction event corresponds to the other virtual agent 440 throwing the CGR baseball 442 at the head of the virtual agent 420, resulting in the virtual agent 420 ultimately falling to the ground.

In some implementations, as represented by block 610, the virtual agent is included in a computer-generated reality (CGR) environment, and the interaction event corresponds to a change to a perceptible characteristic of the CGR environment. In some implementations, the change to the perceptible characteristic of the CGR environment corresponds to the virtual agent moving to a particular portion within the CGR environment. For example, with reference to FIGS. 4E-4G, in response to the virtual agent 420 stepping on the CGR ice patch 432, the electronic device 412 changes motion of the virtual agent 420 from walking towards the CGR chair 431 to slipping on the CGR ice patch 432 and eventually falling on the ground. As another example, as the virtual agent is skipping across an CGR frozen pond, a portion of the CGR frozen pond begins cracking under the virtual agent's feet. In some implementations, the perceptible characteristic of the CGR environment includes visual and auditory characteristics. For example, the interaction event is lightning in the distance and/or thunder associated with the lightning, which causes the virtual agent to shake or recoil in fear.

As represented by block 612, the method 600 includes, in response to registering the interaction event, generating a plurality of torque values, using a motion controller, for the virtual agent based on a function of the motion type and the interaction event. For example, with reference to FIG. 3, the motion controller 330 generates the plurality of torque values. In some implementations, the plurality of torque values is based on environmental features associated with the virtual agent. For example, the environmental features include a representation of an object that is proximate to the representation of the virtual agent. As another example, the object is in the way of the walk of the virtual agent, and thus the virtual agent has to take a half stride (before sitting on the chair) in order to avoid bumping into the chair. In some implementations, the plurality of torque values is a function of body pose information (e.g., as obtained from the body pose converter 332 in FIG. 3), the operation of which is described above with reference to block 504 of FIG. 5.

In some implementations, the method 600 includes generating, by the motion controller: an initial plurality of torque values associated with the motion type, and an initial animation for the virtual agent by providing the initial plurality of torque values to the plurality of virtual joints of the virtual agent. In some implementations, displaying the virtual agent moving according to the motion type corresponds to displaying the initial animation for the virtual agent.

As represented by block 614, the method 600 includes, in response to registering the interaction event, generating an animation for the virtual agent by providing the plurality of torque values to the plurality of virtual joints of the virtual agent. For example, with reference to FIG. 3, the virtual agent motion generator 344 and the animation renderer 346 collectively generate the 3D CGR animation 348. The 3D CGR animation 348 includes a representation of movement of the virtual agent as a function of the plurality of torque values, as generated by the trained motion controller 330. Various examples of the 3D CGR animation 348 are detailed above with reference to blocks 604-610 and FIGS. 4A-4N.

As represented by block 616, in some implementations, the method 600 includes, in response to registering the interaction event, changing display, via the display device, of the virtual agent according to the animation. For example, the method 600 includes displaying the animation on the display device.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at an electronic device including one or more processors, a non-transitory memory, and a display device:
displaying, via the display device, a virtual agent moving according to a first self-directed motion by using a motion controller to generate a first plurality of torque values for a plurality of virtual joints of the virtual agent and by generating a first animation for the virtual agent by providing the first plurality of torque values to the plurality of virtual joints;
while the virtual agent is moving according to the first self-directed motion, registering an interaction event that triggers a change from the first self-directed motion to a second self-directed motion; and
in response to registering the interaction event, displaying, via the display device, the virtual agent moving according to the second self-directed motion by:
generating, using the motion controller, a second plurality of torque values for the virtual agent to perform the second self-directed motion based on the change from the first self-directed motion to the second self-directed motion, the interaction event, and an environmental feature associated with the virtual agent, and
generating a second animation for the virtual agent by providing the second plurality of torque values to the plurality of virtual joints of the virtual agent.

2. The method of claim 1, wherein registering the interaction event includes receiving, via an input device included in the electronic device, an input directed to the virtual agent.

3. The method of claim 2, wherein the input is spatially directed to the virtual agent.

4. The method of claim 2, wherein the input corresponds to a user input.

5. The method of claim 1, wherein the interaction event corresponds to another virtual agent interacting with the virtual agent.

6. The method of claim 1, wherein the virtual agent is included in an enhanced reality (ER) environment, and wherein the interaction event corresponds to a change to a perceptible characteristic of the ER environment.

7. The method of claim 1, wherein the first plurality of torque values and the second plurality of torque values, generated by the motion controller, are based on environmental features associated with the virtual agent.

8. The method of claim 1, further comprising:
generating, based on video data associated with the virtual agent, a body pose model of the virtual agent defined by a branched plurality of neural network systems, wherein each of the branched plurality of neural network systems models a respective portion of the virtual agent;
providing the video data to the branched plurality of neural network systems; and
determining, by the branched plurality of neural network systems, body pose information of the virtual wherein agent;
the first plurality of torque values and the second plurality of torque values for the virtual agent are at least in part a function of the body pose information.

9. An electronic device comprising:
one or more processors;
a non-transitory memory;
a display device; and
one or more programs, wherein the one or more programs are stored in the non-transitory memory and configured to be executed by the one or more processors, the one or more programs including instructions for:
displaying, via the display device, a virtual agent moving according to a first self-directed motion by using a motion controller to generate a first plurality of torque values for a plurality of virtual joints of the virtual agent and by generating a first animation for the virtual agent by providing the first plurality of torque values to the plurality of virtual joints;
while the virtual agent is moving according to the first self-directed motion, registering an interaction event; and
in response to registering the interaction event, displaying, via the display device, the virtual agent moving according to the second self-directed motion by:
generating, using the motion controller, a second plurality of torque values for the virtual agent to perform the second self-directed motion based on the change from the first self-directed motion to the second self-directed motion, the interaction event, and an environmental feature associated with the virtual agent, and
generating a second animation for the virtual agent by providing the second plurality of torque values to the plurality of virtual joints of the virtual agent.

10. The electronic device of claim 9, wherein registering the interaction event includes receiving, via an input device included in the electronic device, an input directed to the virtual agent.

11. The electronic device of claim 10, wherein the input is spatially directed to the virtual agent.

12. The electronic device of claim 10, wherein the input corresponds to a user input.

13. The electronic device of claim 9, wherein the interaction event corresponds to another virtual agent interacting with the virtual agent.

14. The electronic device of claim 9, wherein the first plurality of torque values and the second plurality of torque values, generated by the motion controller, are based on environmental features associated with the virtual agent.

15. The electronic device of claim 9, the one or more programs including instructions for:
generating, based on video data associated with the virtual agent, a body pose model of the virtual agent defined by a branched plurality of neural network systems, wherein each of the branched plurality of neural network systems models a respective portion of the virtual agent;
providing the video data to the branched plurality of neural network systems; and
determining, by the branched plurality of neural network systems, body pose information of the virtual agent;
wherein the first plurality of torque values and the second plurality of torque values for the virtual agent are at least in part a function of the body pose information.

16. A non-transitory computer readable storage medium storing one or more programs, the one or more programs comprising instructions, which, when executed by an electronic device with one or more processors and a display device, cause the electronic device to:
display, via the display device, a virtual agent moving according to a first self-directed motion by using a motion controller to generate a first plurality of torque values for a plurality of virtual joints of the virtual agent, and by generating a first animation for the virtual agent by providing the first plurality of torque values to the plurality of virtual joints;

while the virtual agent is moving according to the first self-directed motion, register an interaction event that triggers a change from the first self-directed motion to a second self-directed motion; and in response to registering the interaction event, display, via the display device, the virtual agent moving according to the second self-directed motion by:

generating, using the motion controller, a second plurality of torque values for the virtual agent to perform the second self-directed motion based on the change from the first self-directed motion to the second self-directed motion, the interaction event, and an environmental feature associated with the virtual agent, and generating a second animation for the virtual agent by providing the second plurality of torque values to the plurality of virtual joints of the virtual agent.

17. The non-transitory computer readable storage medium of claim 16, wherein the interaction event corresponds to another virtual agent interacting with the virtual agent.

18. The non-transitory computer readable storage medium of claim 16, wherein the virtual agent is included in an enhanced reality (ER) environment, and wherein the interaction event corresponds to a change to a perceptible characteristic of the ER environment.

19. The non-transitory computer readable storage medium of claim 16, wherein the first plurality of torque values and the second plurality of torque values, generated by the motion controller, are based on environmental features associated with the virtual agent.

20. The non-transitory computer readable storage medium of claim 16, wherein the one or more programs further cause the electronic device to:

generate, based on video data associated with the virtual agent, a body pose model of the virtual agent defined by a branched plurality of neural network systems, wherein each of the branched plurality of neural network systems models a respective portion of the virtual agent;

provide the video data to the branched plurality of neural network systems; and determine, by the branched plurality of neural network systems, body pose information of the virtual agent;

wherein the first plurality of torque values and the second plurality of torque values for the virtual agent are at least in part a function of the body pose information.

\* \* \* \* \*